United States Patent
Li et al.

(10) Patent No.: US 12,088,335 B2
(45) Date of Patent: Sep. 10, 2024

(54) SIGNAL IDENTIFICATION FOR MULTI-CHANNEL AND MULTI-PROTOCOL COMMUNICATIONS

(71) Applicant: Silicon Laboratories Inc., Austin, TX (US)

(72) Inventors: Qiang Li, Austin, TX (US); Yan Zhou, Spicewood, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/073,028

(22) Filed: Dec. 1, 2022

(65) Prior Publication Data

US 2024/0187036 A1 Jun. 6, 2024

(51) Int. Cl.
*H04B 1/7103* (2011.01)

(52) U.S. Cl.
CPC .................... *H04B 1/7103* (2013.01)

(58) Field of Classification Search
CPC .................................................. H04B 1/7103
See application file for complete search history.

(56) References Cited

U.S. PATENT DOCUMENTS

| | | |
|---|---|---|
| 11,395,188 B2 | 7/2022 | Arslan et al. |
| 2007/0291826 A1* | 12/2007 | Hafuka ............... H04B 1/70754 375/150 |
| 2012/0281791 A1* | 11/2012 | Tsuchida ............... H04B 1/7156 375/343 |
| 2016/0285562 A1* | 9/2016 | Ogasahara ......... H04B 10/6164 |
| 2017/0290035 A1 | 10/2017 | Dickey et al. |
| 2017/0310509 A1* | 10/2017 | Qian .................... H04B 17/336 |
| 2020/0195544 A1 | 6/2020 | Zhou et al. |

OTHER PUBLICATIONS

IEEE, "IEEE Standard for Low-Rate Wireless Networks," IEEE Computer Society, IEEE Std 802.15.4™-2020 (Revision of IEEE Std 802.15.4-2015) downloaded from IEEE Xplore on Sep. 20, 2022 (799 pages).
Silicon Labs, "UG103.14: Bluetooth® LE Fundamentals," Rev. 0.7, downloaded from Silabs.com on Dec. 1, 2022 (21 pages).

* cited by examiner

*Primary Examiner* — Janice N Tieu
(74) *Attorney, Agent, or Firm* — Zagorin Cave LLP

(57) ABSTRACT

Techniques for quickly and accurately determining whether a channel is being used for transmission of data using one of a plurality of communications protocols for low power signals using random data of a packet are disclosed. The techniques increase sensitivity and reduce the false alarm rate for a wide range of signal and noise levels. A noise detection technique uses an adaptive window size for fast noise detection that increases the rate of scanning channels during a signal identification period. In a BLE1M detection mode, detection of clusters of zero frequency deviation are used to reduce the false detection rate. Adaptive Zigbee symbol detection improves detection sensitivity beyond −97 dBm. The techniques use a chip-based differential to generate frequency deviation samples for Zigbee detection or data filtering frequency deviation samples generated using sample-based differentials based on an oversampled received signal to improve the signal-to-noise ratio.

20 Claims, 16 Drawing Sheets

SIGNAL IDENTIFICATION FOR MULTI-CHANNEL AND MULTI-PROTOCOL COMMUNICATIONS

CROSS-REFERENCE TO RELATED APPLICATION(S)

This application is related to U.S. patent application Ser. No. 18/073,032, filed on Dec. 1, 2022, entitled "Noise Detection for Multi-Channel and Multi-Protocol Communications," naming Qiang Li and Yan Zhou as inventors, which application is hereby incorporated by reference.

BACKGROUND

Field of the Invention

This application relates to communications systems in general, and more particularly to detection of data transmitted using one of a plurality of communications protocols.

Description of the Related Art

In general, wireless communications protocols in some frequency bands share the frequency spectrum with at least one other wireless communications protocol. For example, short range radio frequency communications systems operating in the 2.4 GHz frequency band may be compliant with any one of various communications protocols (e.g., Bluetooth™, Bluetooth Low Energy (BLE) 1 Megabits per second (BLE1M), BLE 2 Megabits per second (BLE2M), IEEE 802.15.4 based protocols (e.g., Zigbee™ and Thread™), or other communications protocol standard) and may share the frequency spectrum with other communications protocols (e.g., BLE Coded PHY, i.e., BLE Long Range). A receiver that accurately identifies a communications protocol of a received signal transmission with high sensitivity in a relatively short detection time is desired to quickly scan channels in the shared frequency spectrum for a valid signal, reduce latency, increase communication speeds, and reduce power consumption.

SUMMARY OF EMBODIMENTS OF THE INVENTION

In at least one embodiment, a method for detecting data transmitted using one of a plurality of communications protocols includes receiving a window of frequency deviation samples of an oversampled received signal. The method includes, correlating frequency deviation samples for a first chip position of a first symbol in the window with each of a set of predetermined chip sequences to generate correlation values and providing a maximum correlation value for the first chip position of the first symbol in the window. The method includes determining whether to use one-symbol detection or using two-symbol detection to detect data in the window based on an upper threshold value and at least the maximum correlation value.

In at least one embodiment, a receiver includes a signal detection circuit configured to detect data transmitted using one of a plurality of communications protocols in a window of frequency deviation samples. The signal detection circuit: correlates frequency deviation samples for a first chip position of a first symbol in the window with each of a set of predetermined chip sequences to generate correlation values and provide a maximum correlation for the first chip position of the first symbol in the window. The signal detection circuit determines whether to use one-symbol detection or two-symbol detection to detect data in the window based on an upper threshold value and at least the maximum correlation value.

In at least one embodiment, a method for detecting data transmitted using one of a plurality of communications protocols in an oversampled received signal includes receiving a window of frequency deviation samples having an oversample rate of M. The method includes converting phase samples to frequency samples to generate the window by subtracting an $(i+1)^{th}$ phase sample from an $i^{th}$ phase sample to generate an $i^{th}$ frequency deviation sample. The method includes filtering the window to generate chip-based frequency deviation samples using a filter with a number of taps corresponding to the oversample rate. The method includes detecting data transmitted using one of the plurality of communications protocols in the oversampled received signal using a correlation based on the window and a predetermined set of Direct Sequence Spread Spectrum symbols.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Techniques for quickly and accurately determining whether a channel is being used for low power transmission of data using one of a plurality of communications protocols for using random data of a received signal (i.e., without known structure, e.g., preamble or SYNC word) is disclosed. The techniques increase sensitivity and reduce the false alarm rate for various signal and noise levels. A noise detection technique uses an adaptive window size for fast noise detection that increases the rate of scanning channels during a signal identification period. In a BLE1M detection mode of operation, detection of clusters of zero frequency deviation are used to reduce a false detection rate. Adaptive Zigbee symbol detection improves Zigbee detection sensitivity beyond-97 dBm. Embodiments of the techniques use a chip-based differential to generate frequency deviation samples of an oversampled received signal for Zigbee detection or data filtering of frequency deviation samples generated using a sample-based differential to improve the signal-to-noise ratio.

Figure 1:
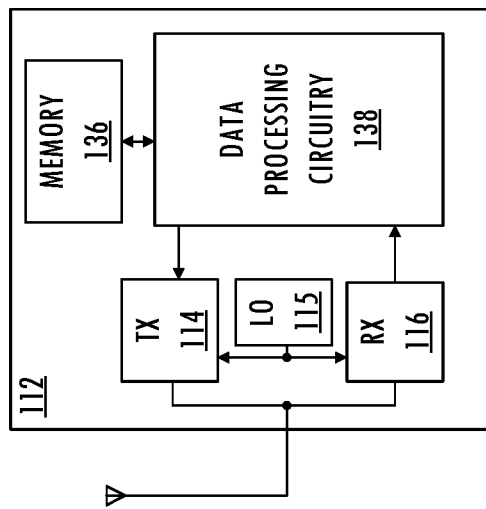
FIG. 1 illustrates a functional block diagram of an exemplary wireless communications system capable of multi-channel and multi-protocol communications.
Figure 1:
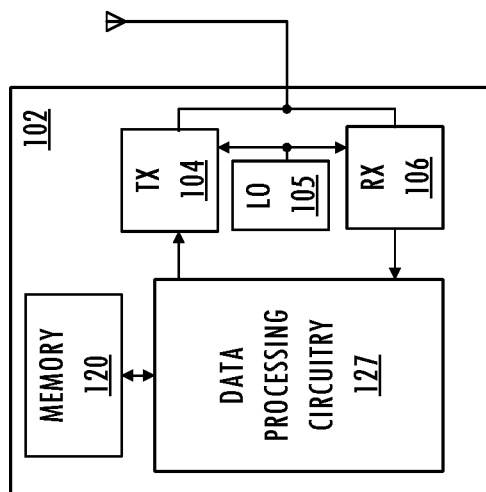

Referring to FIG. 1 in at least one embodiment, wireless communications system 100 includes wireless communications device 102, having transmitter 104, receiver 106, data processing circuitry 127, memory 120, and local oscillator 105, and wireless communications device 112, which includes transmitter 114, receiver 116, data processing circuitry 138, memory 136, and local oscillator 115. Although wireless communications device 102 and wireless communications device 112 are illustrated as each including only one transmitter, receiver, and antenna, in other embodiments of wireless communications system 100, wireless communications device 102 or wireless communications device 112 include multiple transmitters, receivers, and antennas. Wireless communications system 100 is capable of transmitting and receiving data modulated using a Bluetooth™ Low Energy (BLE) 1 Megabits per second communications protocol (BLE1M data), Bluetooth™ Low Energy (BLE) 2 Megabits per second communications protocol (BLE2M data), and data modulated using Zigbee™ communications protocol (Zigbee data). Note that for the purposes of the system described herein the term Zigbee will be used for ease of reference to describe IEEE 802.15.4 based protocols including Zigbee and Thread. Zigbee defines higher-level layers and interoperability sublayers for IEEE 802.15.4 specification low-rate wireless personal area networks with low-power radios. However, in other embodiments, wireless communications system 100 is capable of transmitting and receiving data compliant with other wireless communications protocols. Local oscillator 105 and local oscillator 115 provide signals used in transceiver functions of wireless communications device 102 and wireless communications device 112, respectively.

Figure 2:
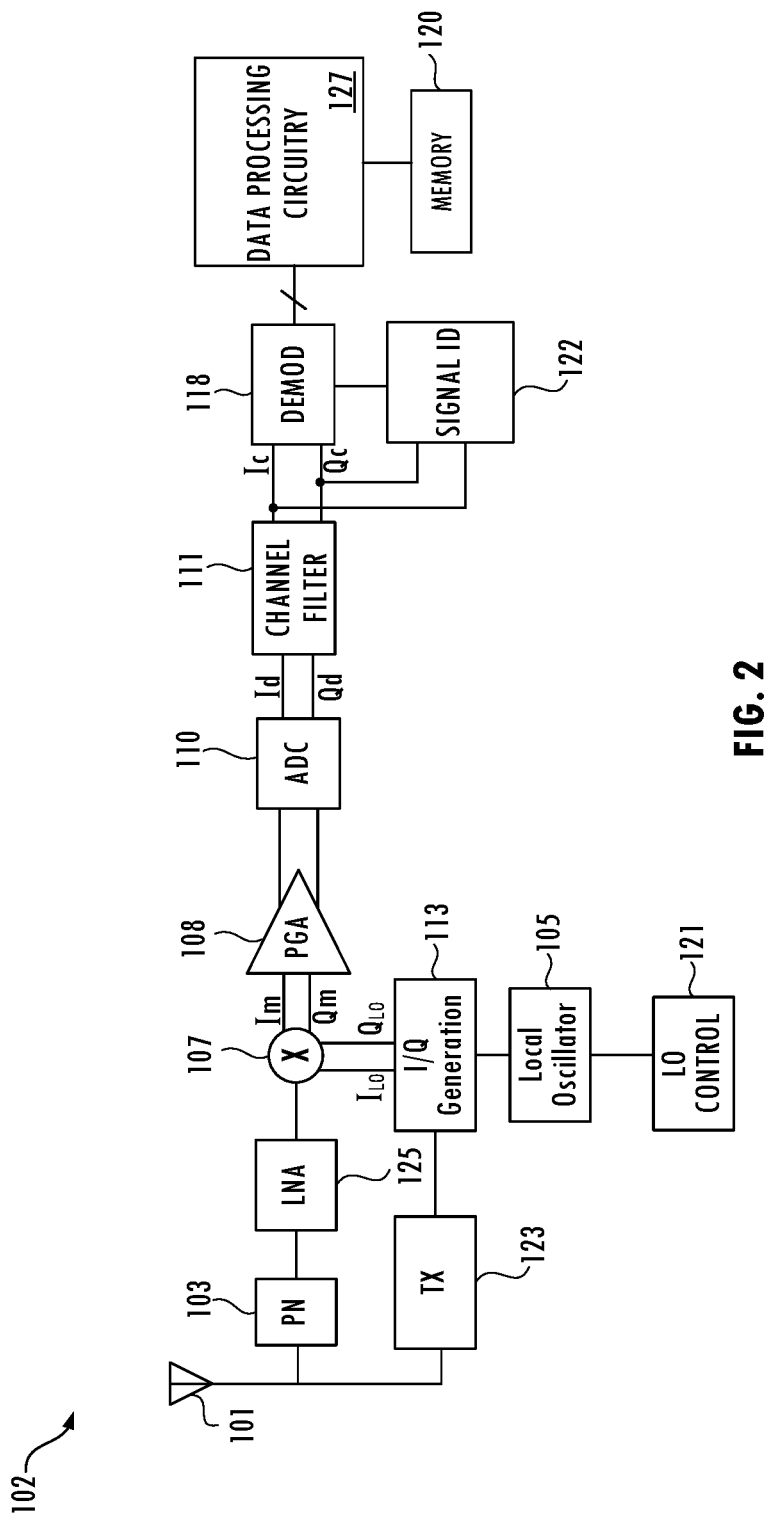
FIG. 2 illustrates a functional block diagram of an exemplary portion of a wireless communications device of FIG. 1.

FIG. 2 illustrates a high-level block diagram of exemplary portions of wireless communications device 102 including fast-switching frequency transmitter 123 and a fast context switching demodulator 118. Antenna 101 provides an RF signal to passive network (PN) 103 that provides impedance matching, filtering, and electrostatic discharge protection. Low-noise amplifier (LNA) 125 amplifies the signals received from passive network 103 without substantial degradation to the signal-to-noise ratio and provides amplified RF signals to mixer 107. Mixer 107 performs frequency translation or shifting of the RF signals, provided by the I/Q generation block 113, which is supplied from local oscillator (LO) 105 implemented in embodiments as a fast frequency synthesizer. I/Q generation block 113 converts the local oscillator signal from local oscillator 105 to I and Q signals for mixer 107 and a transmitter mixer (not shown separately in fast-switching frequency transmitter 123).

Mixer 107 provides a translated output signal as a set of two signals, an in-phase (Im) signal, and a quadrature (Qm) signal, to programmable gain amplifiers (PGA) 108. The Im and Qm signals are analog time-domain signals. In at least one embodiment of communications device 102, programmable gain amplifiers 108, and filters (not separately illustrated) provide amplified and filtered versions of the Im and Qm signals to an analog-to-digital converter (ADC) 110, which converts those versions of the Im and Qm signals to digital Id and Qd signals. Analog-to-digital converter 110 provides digital Id and Qd signals to channel filters 111, which provide digital filtering of the digital Id and Qd signals and provides the filtered Ic and Qc signals to fast context switching demodulator 118, which is capable of concurrent demodulation of multiple physical layer (PHY) transmission modes including Zigbee based PHYs, Bluetooth, BLE, and BLELR transmission modes.

Embodiments of a demodulator configuration that concurrently detect IEEE Zigbee, BLE1M, and BLE2M data, does not require reconfiguration when switching from BLE to Zigbee or from Zigbee to BLE, and allows near-instantaneous switching from BLE to Zigbee with little or no dropped communications are described in U.S. patent application Ser. No. 17/743,047, entitled "Context Switching Demodulator and Symbol Identifier", naming Wentao Li et al. as inventors, filed on May 12, 2022, and U.S. patent application Ser. No. 17/743,042, entitled "Concurrent Listening," naming Terry L. Dickey et al. as inventors, filed on May 12, 2022, which applications are incorporated herein by reference. Embodiments of demodulator 118 that concurrently detect IEEE Zigbee, BLE1M, and BLE2M packets use signal identification circuit 122 to assist in concurrently listening to transmission of multiple PHYs, e.g., to quickly scan multiple advertisement channels for Zigbee, BLE1M, and BLE2M data, jump to another channel to continue scanning for Zigbee, BLE1M, and BLE2M data, prepare the receiver to demodulate a packet in response to detecting Zigbee, BLE1M, and BLE2M data, or enable a power savings mode in the absence of Zigbee, BLE1M, and BLE2M data on any of a predetermined set of channels according to whether a window of frequency deviation samples comprises only noise or Zigbee, BLE1M, and BLE2M data. The window of frequency deviation samples used for detection comprises random data of a packet, therefore, no known structure, e.g., preamble or synchronization word is used.

Demodulator 118 demodulates the digital Ic and Qc signals to retrieve or extract information, such as data that was modulated (e.g., in a transmitter not shown), and provided to antenna 101 as an RF signal. Demodulator 118 includes multiple paths for concurrent demodulation of data transmitted using different PHYs. Demodulator 118 provides the demodulated data to data processing circuitry 127. In some embodiments, data processing circuitry 127 performs a variety of functions (e.g., logic, arithmetic, etc.). While shown separately, portions of data processing circuitry 127 are also used for demodulation and signal identification. Those portions may be dedicated to demodulation or signal identification functions. Other portions of data processing circuitry 127 use the demodulated data in a program, routine, or algorithm (whether in software, firmware, hardware, or a combination thereof) to perform desired control or data processing tasks.

In an embodiment, data processing circuitry 127 includes one or more processors such as a microcontroller(s) and software and/or firmware to perform the desired functions. Memory 120 stores software and firmware for use by data processing circuitry 127 to perform various tasks and stores data supplied to or from data processing circuitry 127. Memory 120 may include multiple kinds of memory in various embodiments including dynamic random-access memory (DRAM), static random access memory (SRAM), and/or non-volatile memory (NVM), according to system needs. In addition, while data processing circuitry 127 can access memory 120, in embodiments, other system components, such as local oscillator control block 121 can also access memory 120, or portions thereof. In embodiments, at least some functionality of local oscillator control block 121 is implemented by software/firmware running on a processor in data processing circuitry 127. FIG. 2 also shows fast-switching frequency transmitter 123 that utilizes the same antenna and local oscillator as the receive path. The transmit data may be sent from memory 120. Details of the transmit path are well known in the art and not further described herein.

Figure 3:
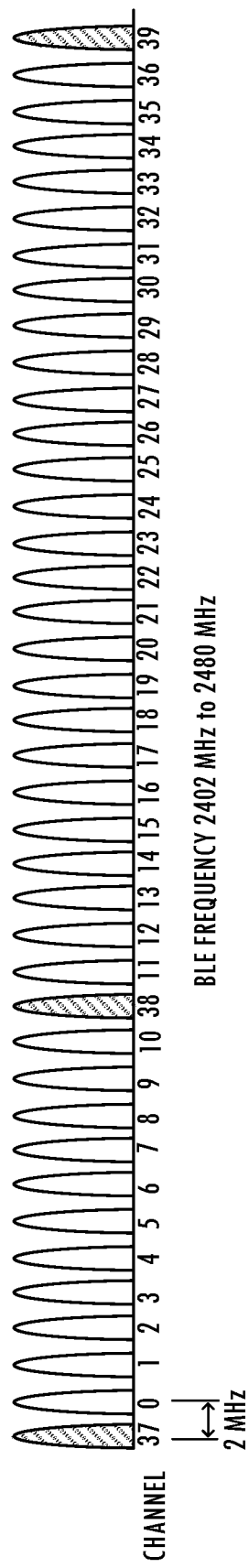
FIG. 3 illustrates the 40 radio frequency (RF) channels of the BLE communications protocol.

Wireless communications device 102 includes signal identifier 122, which provides noise detection capability and signal identification capability to assist in concurrently listening to transmissions of multiple PHYs. Embodiments of signal identifier 122 provide significant performance improvement in monitoring both Zigbee unknown receiver arrival listening and BLE1 and BLE2 arrival on BLE channels in the 2.4 GHz frequency band. Embodiments described herein support background concurrent listening to IEEE 802.15.4 based protocols, e.g., Zigbee receive (RX) channels (2405 MHz to 2480 MHz spaced 5 MHz apart) and BLE advertising channels as shown in FIG. 3. FIG. 3 illustrates the 40 RF channels in BLE separated by 2 MHz center to center. The BLE channels include Primary Advertising Channels 37, 38, and 39 with center frequencies of 2402 MHZ, 2426 MHz, and 2480 MHz respectively. The remaining 37 channels are called the Secondary Advertisement Channels and are used for data transfers during a connection state. Secondary advertising channels are used as auxiliary channels meaning that a device must first advertise on the primary advertising channels before sending out advertising packets on the secondary channels. In the Advertising state, a device sends out packets containing useful data for others to receive and process.

Figure 4:
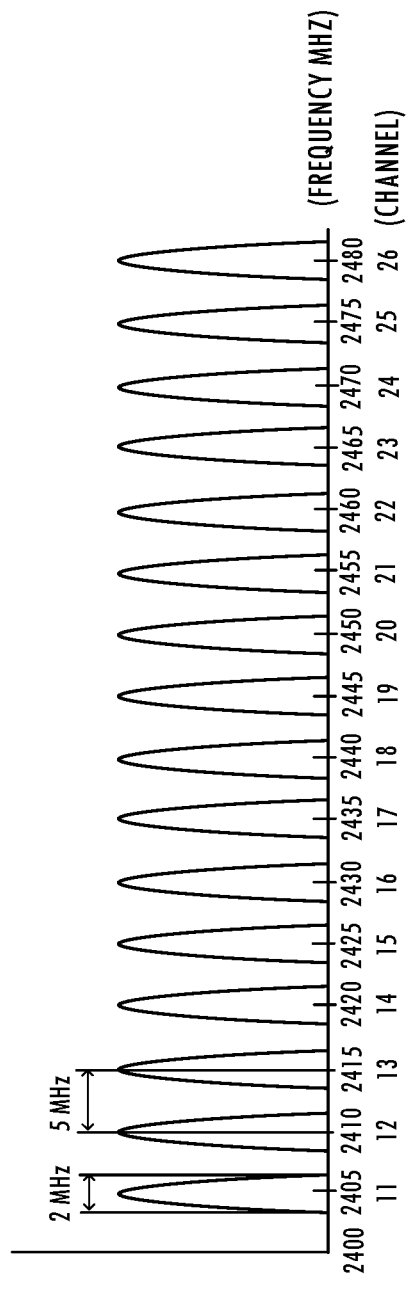
FIG. 4 illustrates RF channels 11 to 26 of the Zigbee communications protocol.

FIG. 4 illustrates Zigbee channels 11 to 26 (2405 MHz to 2480 MHz) with a width of 2 MHz separated by 5 MHz center to center. Note that BLE advertising channel 39 (2480 MHz) and Zigbee channel 26 (2480 MHz) are centered at the same frequency. Thus, simultaneous listening and demodulation is required for concurrent listening. Note that the Zigbee channels 15, 20, and 25 are popular channels because they fall in the gaps between popular channels used by an IEEE 802.11 communications protocol for local area networking (e.g., channels 1, 6, and 11, each with 20 MHz bandwidth and respective center frequencies of 2412 MHz, 2437 MHz, and 2462 MHz).

Figure 5:
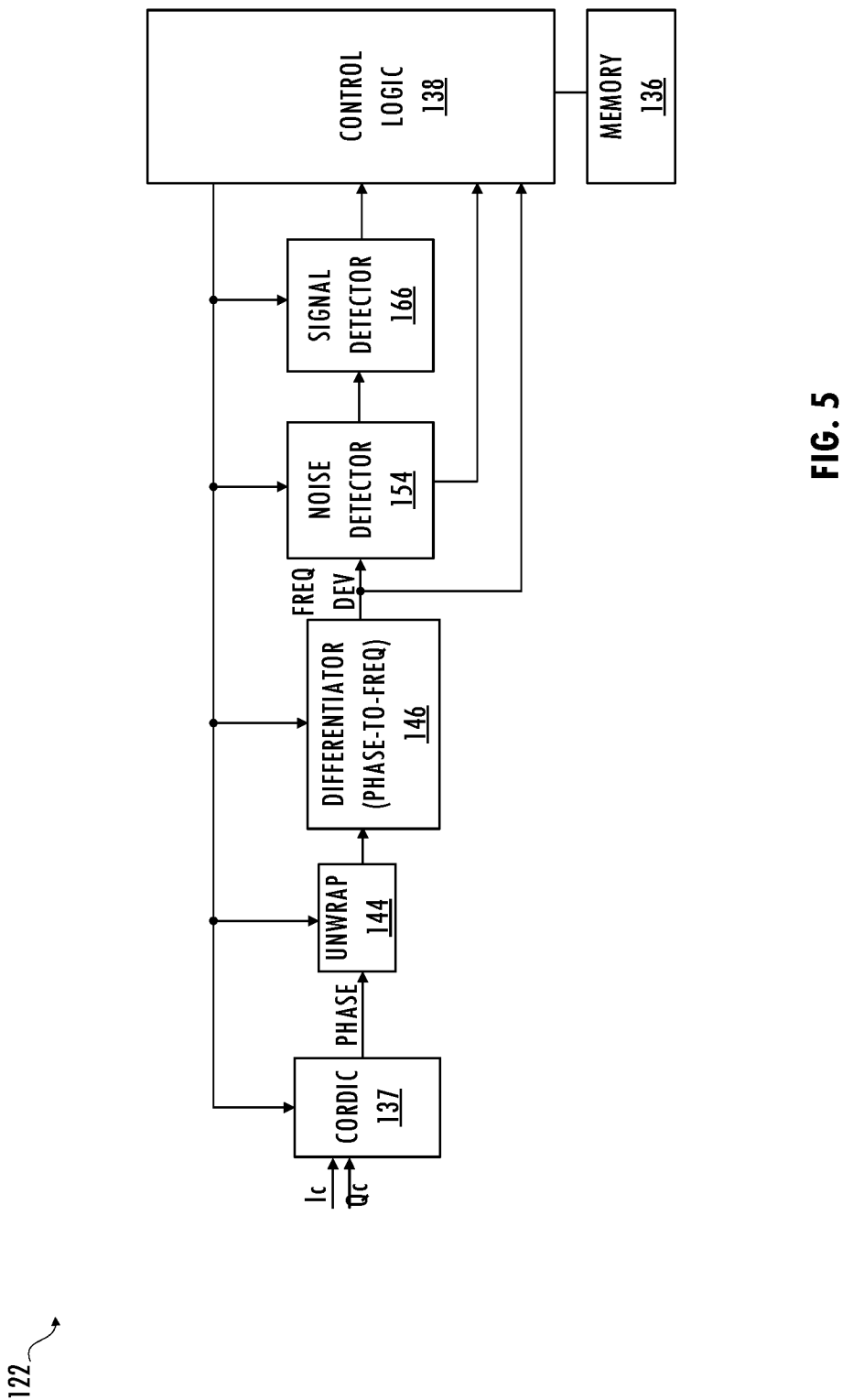
FIG. 5 illustrates a functional block diagram of exemplary signal identification circuitry of a receiver portion of FIG. 2.

Referring to FIGS. 2 and 5, in at least one embodiment, signal identifier 122 includes COordinate Rotation DIgital Computer (CORDIC) 137, which converts digital Ic and Qc signals from a Cartesian representation into a polar representation (e.g., using an arctangent operation to generate instantaneous phase and instantaneous amplitude) for use by other circuits. In general, a CORDIC implements known techniques to perform calculations, including trigonometric functions and complex multiplies, without using a multiplier. The operations the CORDIC uses are addition, subtraction, bit-shift, and table-lookup operations. In other embodiments, a digital signal processor executing firmware performs the conversion. In an embodiment, CORDIC 137 provides phase information in samples with an oversampling rate (OSR) (e.g., OSR=4) to unwrap circuit 144 in some embodiments or directly to differentiator 146 in other embodiments. Differentiator 146 provides outputs to noise detector 154. In addition, outputs of differentiator 146 are stored in memory for use by signal detector 166.

In some embodiments of a wireless communications system, the frequency (a frequency of 2.4 GHz) corresponds to a wavelength (e.g., wavelength of approximately 12 cm) that causes phase to wrap, resulting in ambiguity in subsequent measurements. Unwrap circuit 144 counts the number of cycles of $2\pi$ by detecting a phase jump at the $\pi$ to $-\pi$ boundary in the digital representation of the angle. Unwrap circuit 144 adds the cycle count to the instantaneous angle to form the unwrapped phase value and provides the unwrapped phase values to differentiator 146, which generates frequency estimates based on the unwrapped phase values, e.g., by computing discrete time phase difference values (e.g., $\phi[n]-\phi[n-1]$). If the local oscillator of the transmitting communications device is perfectly matched to local oscillator 105, then the output of differentiator 146 is a value corresponding to the frequency deviation of the modulation scheme (e.g., a predetermined value corresponding to ±250 kHz for BLE1M or ±500 kHz for BLE2M). However, other frequency deviation may cause an output of differentiator 146 (i.e., a frequency deviation sample) to be a value within a range of values around the values corresponding to ±250 kHz for BLE1M or ±500 kHz for BLE2M.

In at least one embodiment, signal identifier 122 includes noise detector 154 and signal detector 166. In at least one embodiment, noise detector 154 has a limited time (e.g., 12

μs) to distinguish between a window of frequency deviation samples that includes only noise from windows of frequency deviation samples that have a high probability of including BLE1M, BLE2M, or Zigbee. As referred to herein, a received signal or window of frequency deviation samples includes only noise if BLE1M, BLE2M, or Zigbee data is absent from the received signal or window of frequency deviation samples.

Zigbee utilizes Offset-Quadrature Phase-Shift Keying (OQPSK) with DSSS (Direct Sequence Spread Spectrum) while BLE uses Gaussian Frequency-Shift Keying (GFSK). Thus, by determining whether the received signal includes chips specified by OQPSK with DSSS, signal detector 166 can determine whether data in the received signal represents a Zigbee packet. The time for determining whether the received signal includes a Zigbee packet or includes only noise is becoming increasingly critical for the communications system and requires increased detection sensitivity as specifications reduce the power levels of communications signals. For example, an exemplary specification requires signal identification in less than 16 μs for signal levels as low as −97 dBm, whereas prior specifications require signal identification in 50 μs or less. In addition, if the system quickly detects the absence of Zigbee data being received using a channel, then the receiver can switch channels sooner to allow the system to accommodate more channels with a single receiver integrated circuit in a predetermined period of time or can reduce the number of receiver integrated circuits needed to monitor multiple channels.

As described above, noise detector 154 receives samples having values corresponding to a frequency deviation of a carrier signal (e.g., a frequency deviation from one of sixteen frequencies within the 2400-2483.5 MHz frequency band) and the values correspond to frequency deviations of around ±250 kHz for BLE1M or ±500 kHz for BLE2M or Zigbee. In contrast, windows of frequency deviation samples including only noise would have values corresponding to frequency deviations in a substantially wider frequency range.

Figure 6:
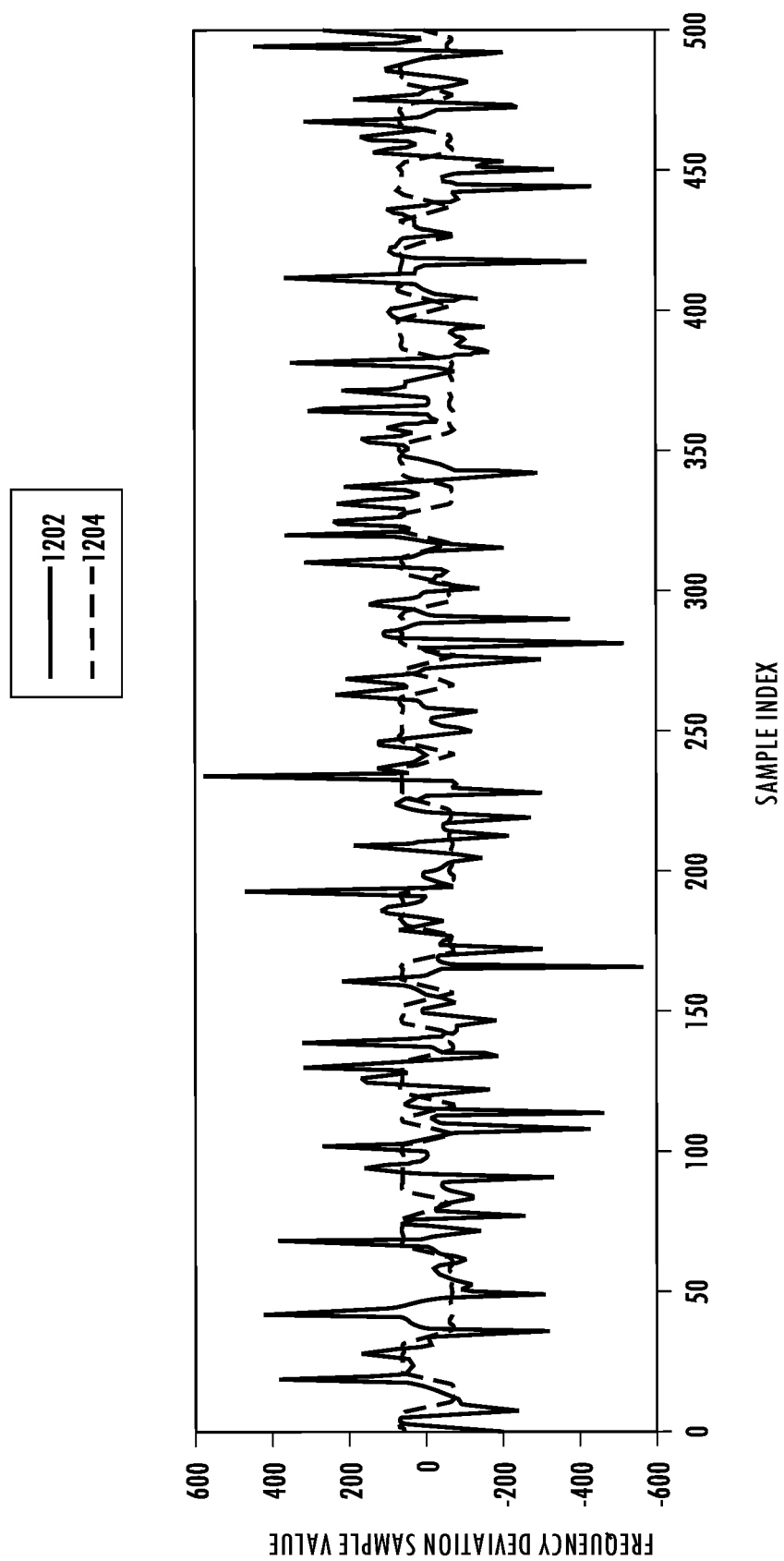
FIG. 6 illustrates waveforms of frequency deviation samples as a function of sample index of a received signal including only noise and a received signal including Zigbee data.
Figure 7:
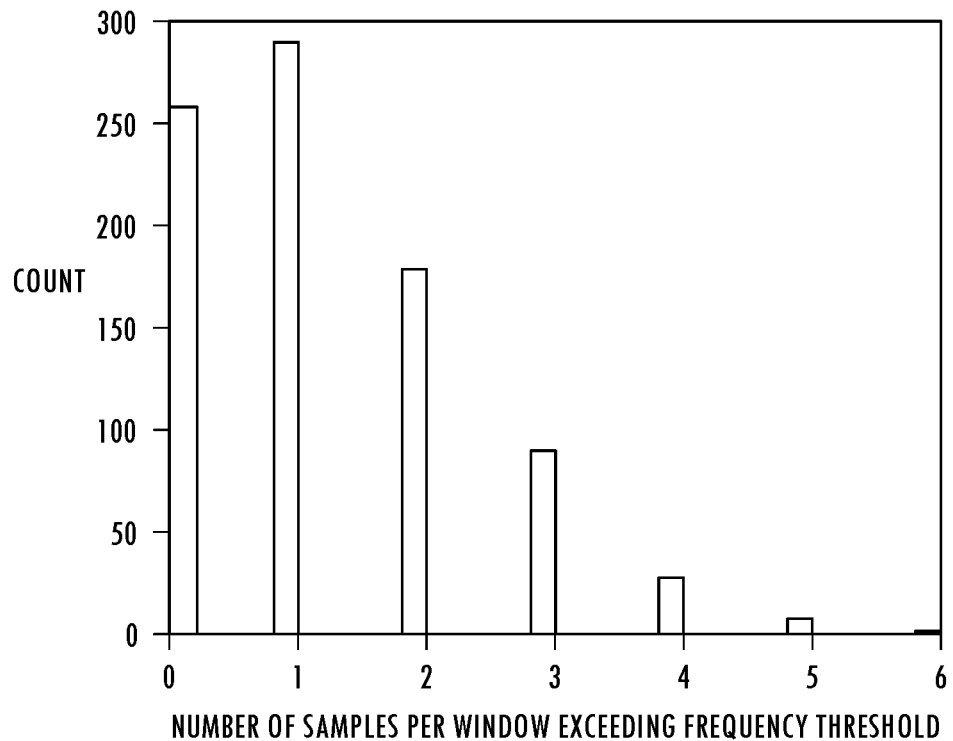
FIG. 7 illustrates a histogram of number of occurrences of a frequency deviation sample exceeding a frequency deviation threshold in an 8 μs window of frequency deviation samples of a received signal including Zigbee data.
Figure 8:
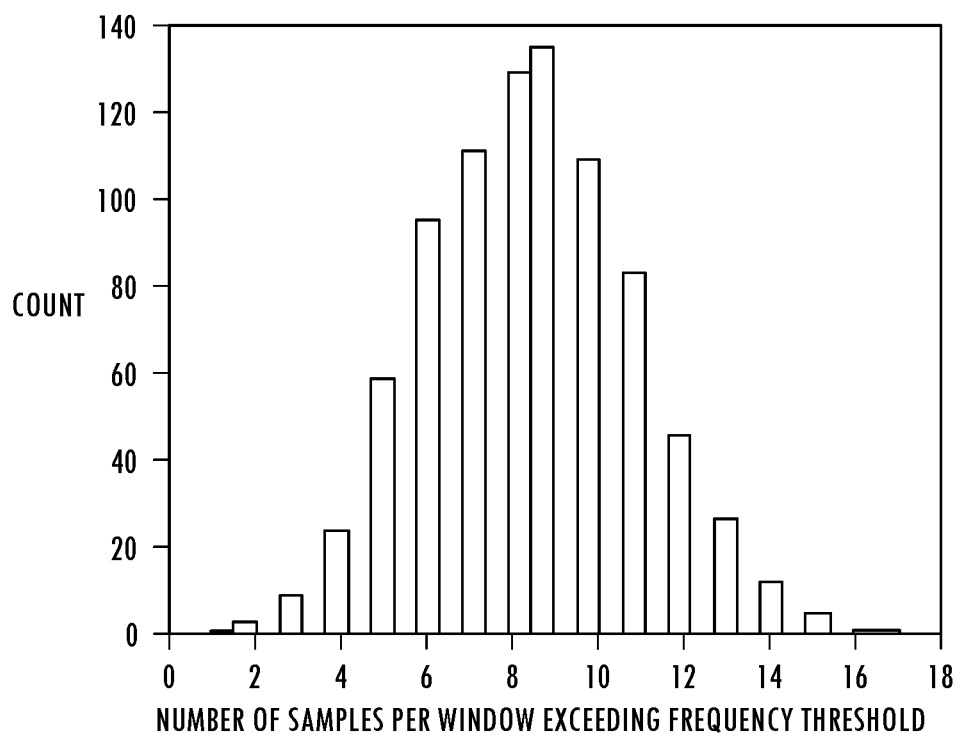
FIG. 8 illustrates a histogram of number of occurrences of a frequency deviation sample exceeding a frequency deviation threshold in an 8 μs window of frequency deviation samples of a received signal including only noise.
Figure 9:
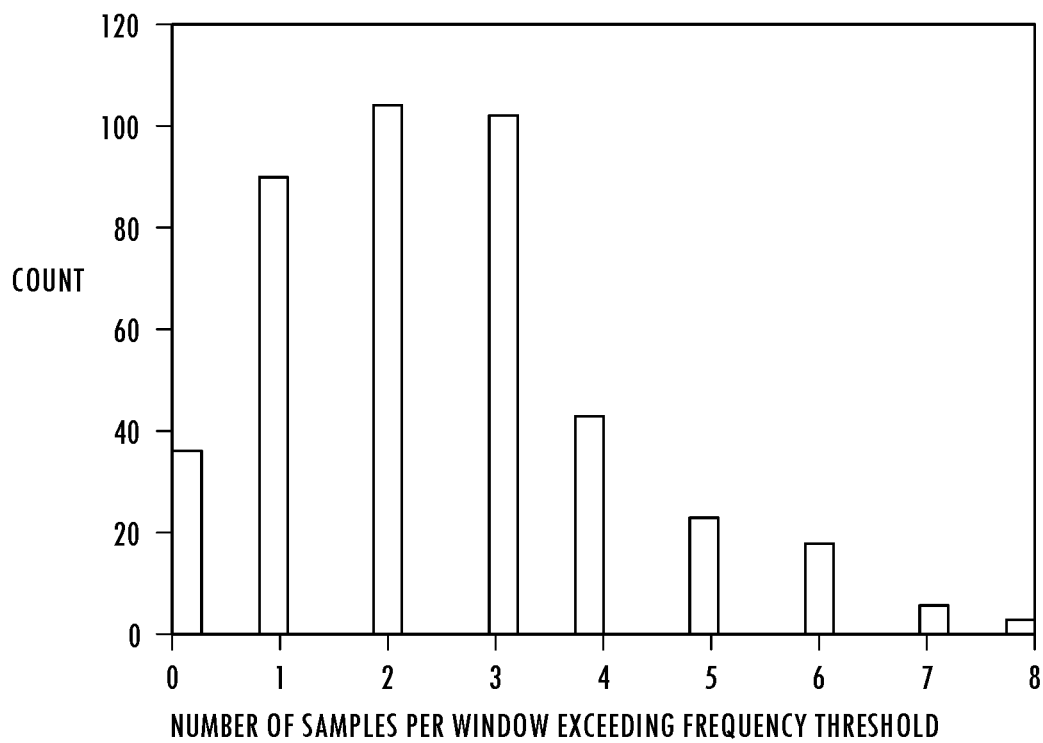
FIG. 9 illustrates a histogram of number of occurrences of a frequency deviation sample exceeding a frequency deviation threshold in a 16 μs window of frequency deviation samples of a received signal including Zigbee data.
Figure 10:
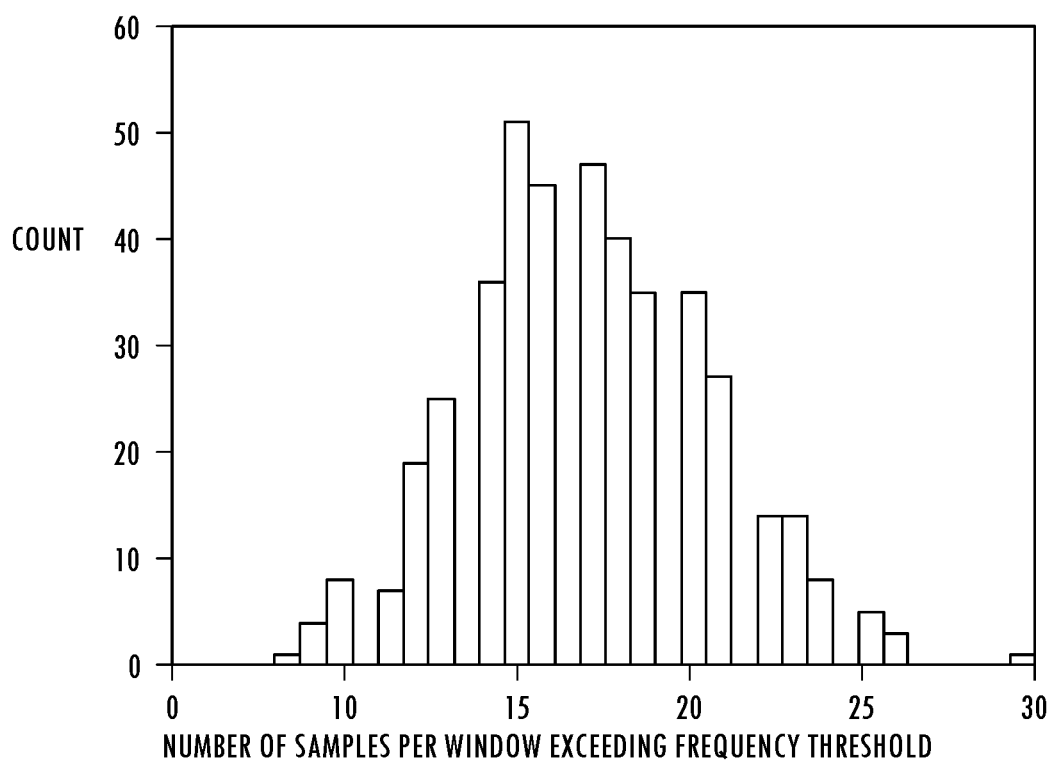
FIG. 10 illustrates a histogram of number of occurrences of a frequency sample exceeding a frequency deviation threshold in a 16 μs window of frequency deviation samples of a received signal including only noise.

Referring to FIGS. 6-10, signal 1204 is an exemplary received signal including various windows of Zigbee data received at a power level of −60 dBm having frequency deviation values in a first range of values (e.g., +/−50). Each 8 μs window of a received signal includes 64 samples at an oversample rate of four. In contrast, signal 1202 of FIG. 6 is another exemplary received signal including only noise having a wider range of frequency deviation samples. A histogram of the number of frequency deviation samples per window that exceed a predetermined frequency deviation threshold for a received signal including Zigbee data and transmitted at a power level of −97 dBm (FIG. 7) indicates that all of the 8 μs windows have six frequency deviation samples or less that exceed the predetermined frequency deviation threshold. If a noise detector has a predetermined threshold count of six to detect a window that includes a Zigbee signal, then the noise detector would detect all of the Zigbee data in the received signal associated with FIG. 7. A histogram of the number of frequency deviation samples per window that exceed a predetermined frequency deviation threshold for a received signal including only noise (FIG. 8) indicates a normal distribution of the number of samples exceeding the predetermined frequency threshold (e.g., 50) in an 8 μs window. If the predetermined threshold count is six, the noise detector erroneously detects approximately 10% of the windows including only noise as including Zigbee data (i.e., has a false alarm rate of approximately 10%) when using only the 8 μs window for noise detection.

By increasing the window size from 8 μs to 16 μs, a histogram corresponding to a received signal transmitted with a power level of −97 dBm (FIG. 9) indicates that all of the 16 μs windows have eight frequency deviation samples or less with values exceeding the predetermined frequency deviation threshold. For a predetermined threshold count of ten (e.g., less than twice the count for an 8 μs window), the noise detection technique will detect the Zigbee data in all of the windows. A histogram of the number of frequency deviation samples per window that exceed a predetermined frequency deviation threshold for a received signal including only noise (FIG. 10) indicates a normal distribution of the number of frequency deviation samples exceeding the predetermined frequency deviation threshold in a 16 μs window. Where the predetermined threshold count is ten, only a negligible number of windows of noise are erroneously detected as including Zigbee data (e.g., the false alarm rate is less than 1% when using the 16 μs window for noise detection and erroneous detection is handled later during signal detection.

Referring back to FIG. 5, in some embodiments, noise detector 154 is selectively configured to perform frequency correction. Control logic 139 is configured to enable frequency correction within noise detector 154 when the latency of noise detector 154 is not a critical timing path. If control logic 139 does not enable frequency correction during noise detection, then frequency offset estimate and correction is performed after noise detection in signal detector 166. By disabling frequency offset detection and correction in noise detector 154 when not necessary for noise detection, noise detector 166 is able to scan more channels for BLE1M, BLE2M, or Zigbee data. Although some embodiments of noise detector 166 use frequency correction to distinguish noise from BLE1M data, the same predetermined frequency deviation threshold will not need frequency correction detecting BLE2M data or Zigbee data due to the higher frequency deviations of BLE2M or Zigbee data as compared to BLE1M data. Increasing the predetermined frequency deviation threshold to reduce or eliminate the need for frequency correction during noise detection is a tradeoff with sensitivity of noise detection that may increase the false alarm rate.

Referring to FIG. 5, in at least one embodiment, noise detector 154 implements an adaptive noise detection technique that improves the average detection time (e.g., reduces the average detection time from approximately 12 μs to approximately 9 μs). Rather than always using one window to determine presence or absence of BLE1M, BLE2M, or Zigbee data, the adaptive noise detection technique uses an adaptive window size. If a window of frequency deviation samples has greater than a predetermined threshold count of frequency deviation samples that exceed the predetermined threshold frequency deviation, then noise detector 154 discards that window of frequency deviation samples as including only noise and noise detector 154 jumps to a next window of frequency deviation samples (received using the same or other communications channel). However, if the count of frequency deviation samples that exceed the predetermined frequency deviation threshold in the window has less than (or equal) the predetermined threshold count, then noise detector 154 evaluates an additional window of frequency deviation samples, which increases the accuracy of the determination of whether the window comprises BLE1M, BLE2M, or Zigbee data as compared to an evaluation using fewer frequency deviation samples.

An embodiment of noise detector 154 receives a window of frequency deviation samples from buffer 150. Noise detector 154 compares each frequency deviation sample in the window to a predetermined frequency deviation threshold and counts how many frequency deviation samples of the window exceed the predetermined frequency deviation threshold (e.g., using a counter or control logic 139). This technique is compatible with using a non-linear CORDIC conversion of Ic and Qc samples to phase and frequency, which amplifies small random signal jumps of a noise signal into spikes in a corresponding frequency signal. If the number of frequency deviation samples of the window exceeding the predetermined frequency deviation threshold exceeds a predetermined threshold count, noise detector 154 determines that the window of frequency deviation samples includes only noise and discards that window of frequency deviation samples or does not provide those frequency deviation samples to signal detector 166. In response to detecting a window of frequency deviation samples that includes only noise or a predetermined number of consecutive windows of frequency deviation samples that include only noise, control logic 139 (e.g., a finite state machine or microcontroller unit) may trigger the receiver to change the channel (e.g., update the frequency of local oscillator 105) used to receive signals to a different frequency within the 2400-2483.5 MHz frequency band. Noise detector 154 has a high sensitivity that is sufficient to distinguish noise from signal without missing the data window and allows signal detector 166 to detect signal properly. In addition, the speed of noise detector 154 is directly related to the number of channels that noise detector 154 can scan for BLE1M, BLE2M, or Zigbee data.

In at least one embodiment, in response to the count of frequency deviation samples of a window being less than (or equal) a predetermined threshold count of frequency deviation samples that exceed the predetermined threshold frequency deviation, noise detector 154 does not update outputs (e.g., does not store the window of frequency deviation samples for use by signal detector 166 or does not update an indicator that the current window of samples includes BLE1M, BLE2M, or Zigbee data) based on the current window of frequency deviation samples. Instead, noise detector 154 compares each frequency deviation sample in a next window of received frequency deviation samples to the predetermined threshold frequency deviation and counts how many frequency deviation samples of the next window have values that exceed the predetermined threshold frequency deviation. Noise detector 154 combines the count corresponding to the current window and the additional count corresponding to the next window to generate a combined count and compares the combined count to a second predetermined threshold count. In at least one embodiment, the second predetermined threshold count (e.g., 12) is twice the predetermined threshold count (e.g., 6). However, other values for the second predetermined threshold count (e.g., 10) may be used.

In another embodiment, noise detector 154 uses an additional window of samples of buffer 150 and compares each frequency deviation sample of the buffer (i.e., two windows of samples) to the predetermined threshold frequency value and determines how many frequency deviation samples of the two windows have values that exceed the predetermined threshold frequency value to generate the combined count. Noise detector 154 compares the combined count to the second predetermined threshold count. If the combined count exceeds the second predetermined threshold count, then noise detector 154 determines that the window of frequency deviation samples includes only noise and discards that window of samples. Otherwise, noise detector 154 updates outputs (e.g., an indication that the current window of frequency deviation samples includes BLE1M, BLE2M, or Zigbee data) and stores the window for use by signal detector 166 based on the current window of samples.

Figure 11:
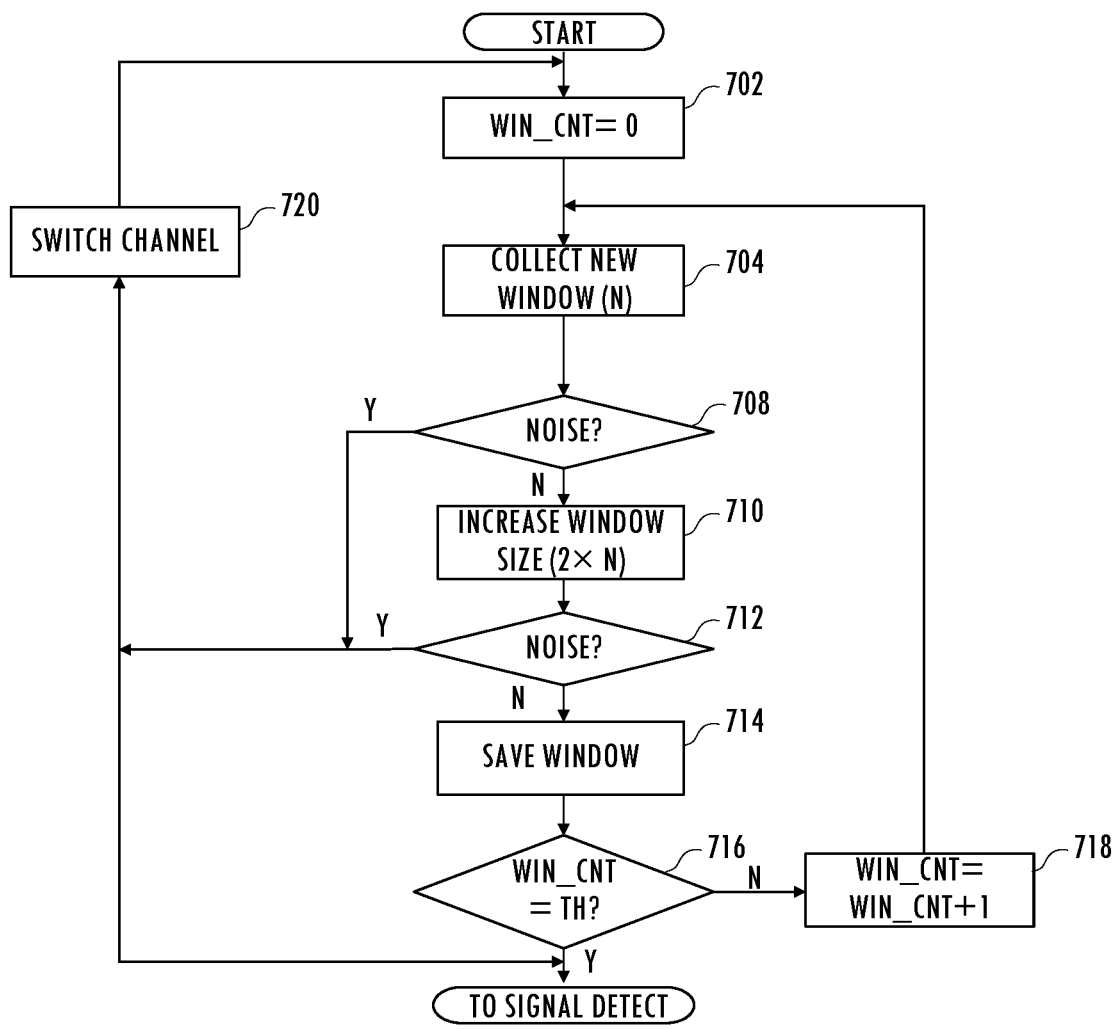
FIG. 11 illustrates information and control flows for adaptive noise detection consistent with at least one embodiment of the invention.

Referring to FIGS. 5 and 11, in at least one embodiment, noise detector 154 initializes a window count to zero (702) and noise detector 154 collects a first window of frequency deviation samples (704). The initial duration of the window is selected based on the mode of operation of signal identification circuit 122. For example, noise detector 154 uses a number of frequency deviation samples corresponding to a 4 μs window when signal identification circuit 122 is configured to detect data transmitted using Zigbee or BLE2M communications protocols and a number of frequency deviation samples corresponding to an 8 μs window when signal identification circuit 122 is configured to detect data transmitted using BLE1M. Noise detector 154 determines that whether the window includes only noise, as described above. In an embodiment, if noise detector 154 determines the window includes only noise (708) then noise detector 154 generates an indication thereof that may trigger the receiver to discard the window of frequency deviation samples, switch the channel monitored by the receiver (720), and restart the noise detection process. If noise detector 154 determines that the window includes BLE1M, BLE2M, or Zigbee using a technique described above or other technique (708), then control circuitry 139 increases the window size (e.g., doubles the window size from N frequency deviation samples to 2×N frequency deviation samples) (710) and determines whether the enlarged window includes only noise (712) as described above. If noise detector 154 determines that the enlarged window includes only noise (712), then noise detector 154 generates an indication thereof that may trigger the receiver to discard those frequency deviation samples, switch the channel monitored by the receiver (720), and restart the noise detection process. If noise detector 154 determines that the enlarged window includes BLE1M, BLE2M, or Zigbee data (708) then noise detector 154 generates an indication thereof or stores the window of frequency deviation samples for processing by signal detector 166 (714). If the number of windows including the valid signal is below a predetermined threshold TH (716), then control logic 139 increments the window count (718) and monitors the next window for the valid signal. If a sufficient number of windows including the valid signal have been collected, then those windows are provided to signal detector 166.

Figure 12:
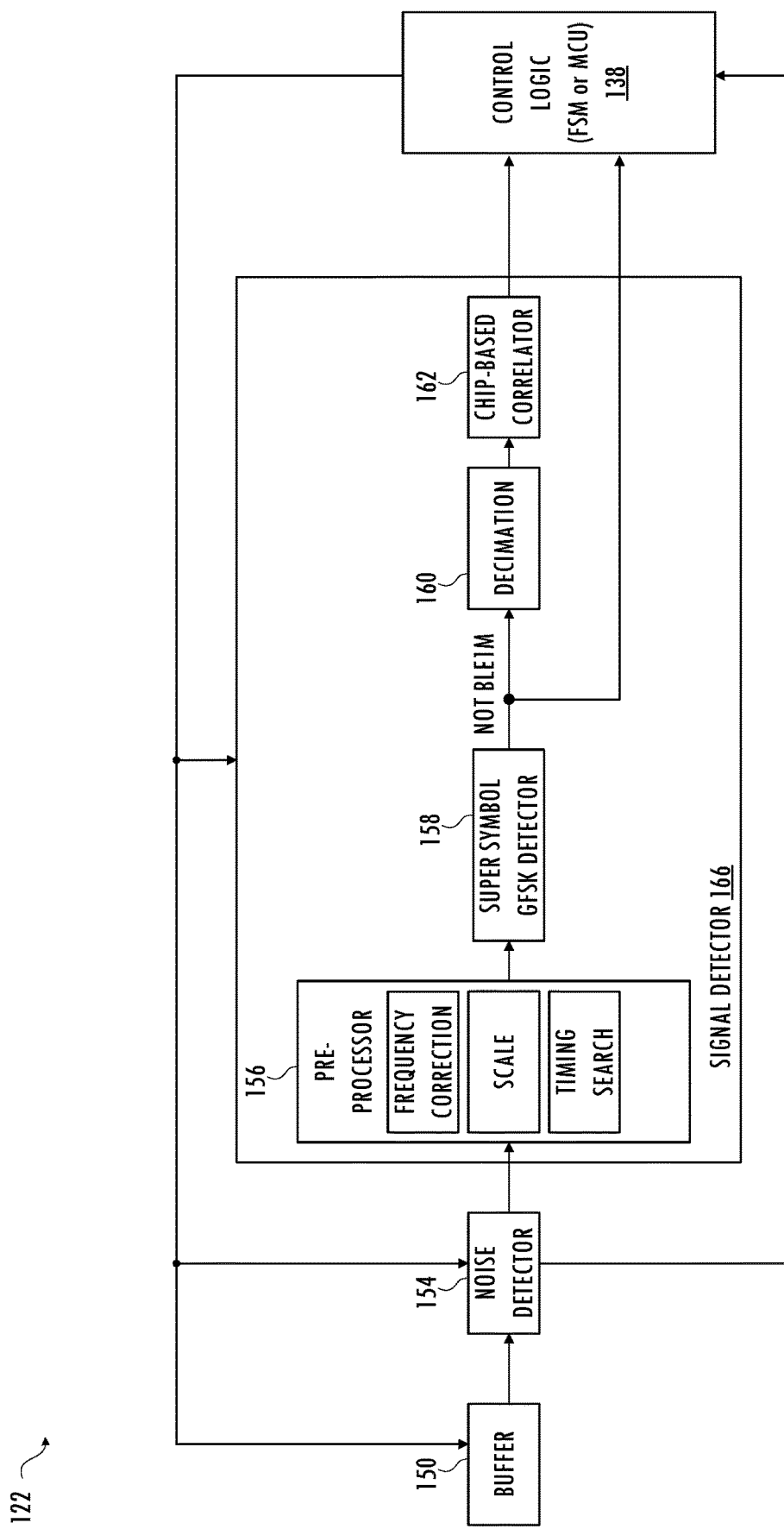
FIG. 12 illustrates a detailed functional block diagram of exemplary portions of the signal identification circuit of FIG. 5.

Referring to FIG. 12, in an embodiment, noise detector 154 provides windows of frequency deviation samples including BLE1M, BLE2M, or Zigbee data to signal detector 166, e.g., by writing those frequency deviation samples to another buffer (not shown) accessible by pre-processor 156. In at least one embodiment, signal identification circuit 122 is configured to operate in one of three modes of operation at a time: a BLE1M detection mode of operation that detects BLE1M data, a BLE2M detection mode of operation that detects BLE2M data, or a Zigbee detection mode of operation that detects Zigbee data. In at least one embodiment, a receiver needs to identify multiple signals concurrently, multiple instantiations of signal detector 166 are included in the receiver, each signal detector 166 is configured for one of the detection modes of operation, and each signal detector 166 generates corresponding detection indicators. However, note that each instantiation of signal detector 166 may share hardware with another instantiation of signal detector 166 (e.g., memory or control logic).

In at least one embodiment, pre-processor 156 processes frequency deviation samples, e.g., performs frequency correction that removes any frequency offset (e.g., a frequency offset of up to 200 kHz for BLE1M, BLE2M, or Zigbee) to improve analysis of the received signal. An exemplary frequency correction routine calculates an average positive frequency deviation for the window based on all of the positive frequency deviation samples in the window, calculating an average negative frequency deviation of all of the negative frequency deviation samples in the window, and then averaging the average positive frequency deviation and the average negative frequency deviation to generate a frequency offset value. Noise detector 154 subtracts that frequency offset value from each frequency deviation sample of the window. In at least one embodiment, actual frequency deviation values are less than theoretical values. For example, in a configuration having a nominal frequency deviation of +/−500 kHz, if the signal changes slowly (e.g., 00001111), then the signal reaches full swing of +/−500 kHz. However, if the signal changes quickly (e.g., 01010101), then bandwidth limitations prevent the signal from reaching full swing of +/−500 kHz, e.g., the signal reaches 450 kHz and ramps down towards-500 KHz. Accordingly, signal detector 166 is configured to scale the frequency deviation samples using a predetermined scaling factor to compensate for such discrepancies. Since Zigbee has a wider bandwidth than BLE2M, Zigbee can ramp frequency deviation up and down quickly and achieves a full swing of +/−500 kHz without scaling.

After any frequency offset correction or frequency deviation scaling, pre-processor 156 performs a timing search. In at least one embodiment, the timing search is a widest eye-opening timing search. In an embodiment, since the incoming data signal is oversampled by a factor of OSR (e.g., 4), the incoming data signal is sampled at a frequency that is OSR multiplied by bit rate (BR). Pre-processor 156 associates each frequency deviation sample with a bin, where the number of bins is based on the OSR. For example, four bins are used for an OSR of four. The first frequency deviation sample is associated with a first bin, the second frequency deviation sample is associated with a second bin, and so on. The bin with which frequency deviation sample N is associated is defined as modulo (N, OSR). Pre-processor 156 averages the absolute values of the frequency deviation samples associated with each bin. The bin having the highest average value is used as the phase of the recovery clock. In other embodiments, other techniques for determining the timing may be used.

In at least one embodiment, super symbol GFSK detector 158 receives a buffer of frequency deviation samples based on a received signal that was sampled using the phase identified in the timing search. If the timing search selected the correct phase of the recovery clock, all of the frequency deviation samples in the buffer have a value that represents +/−Fd of a particular communications protocol with some margin. In an embodiment, signal detector 166 counts the number of frequency deviation samples in the buffer that are not within the expected ranges (e.g., the number of frequency deviation samples that are not within a range that is +/−$m_p$ of +Fd or +/−$m_p$ of −Fd), where $m_p$ is a margin value (e.g., 20%) that may be programmable. If that number exceeds a predetermined threshold, then the window fails the super symbol GFSK detection. U.S. Pat. No. 11,184,272, entitled "Zigbee, Thread and BLE Signal Detection in a WiFi Environment", naming Yan Zhou et al. as inventors, filed Dec. 13, 2018, which is incorporated herein by reference, further describes frequency offset correction, timing search, and super symbol GFSK detection techniques for BLE and Zigbee. Accordingly, signal detector 166 proceeds to use the buffer of frequency deviation samples adjusted by pre-processor 156 to detect BLE1M, BLE2M, or Zigbee data.

Since the frequency deviation of BLE2M (frequency deviation of 500 kHz and symbol rate of 2 Mbps) is twice the frequency deviation of BLE1M (frequency deviation of 250 kHz and symbol rate of 1 Mbps), but the bandwidth of BLE2M is halved and subsampled, super symbol GFSK detector 158 can have a high false alarm rate for BLE2M data transmitted at lower power levels and received by a signal detector configured to detect BLE1M data. In at least one embodiment, a receiver configured to detect BLE1M data implements a narrow bandwidth channel filter (e.g., a 1.1 MHz-1.26 MHz or +/−600 kHz bandwidth channel filter). This narrowband channel filter causes BLE2M data received by a signal detector configured to detect BLE1M data to receive continuous frequency deviation samples having zero or negligible frequency deviation. In at least one embodiment, signal detector 166 implements a technique that increases signal detection sensitivity while achieving zero or negligible false detection rate across all signal power levels. The technique detects clusters of zero or negligible frequency deviation samples to reduce the false alarm rate of a signal detector configured to detect BLE1M data.

Figure 13:
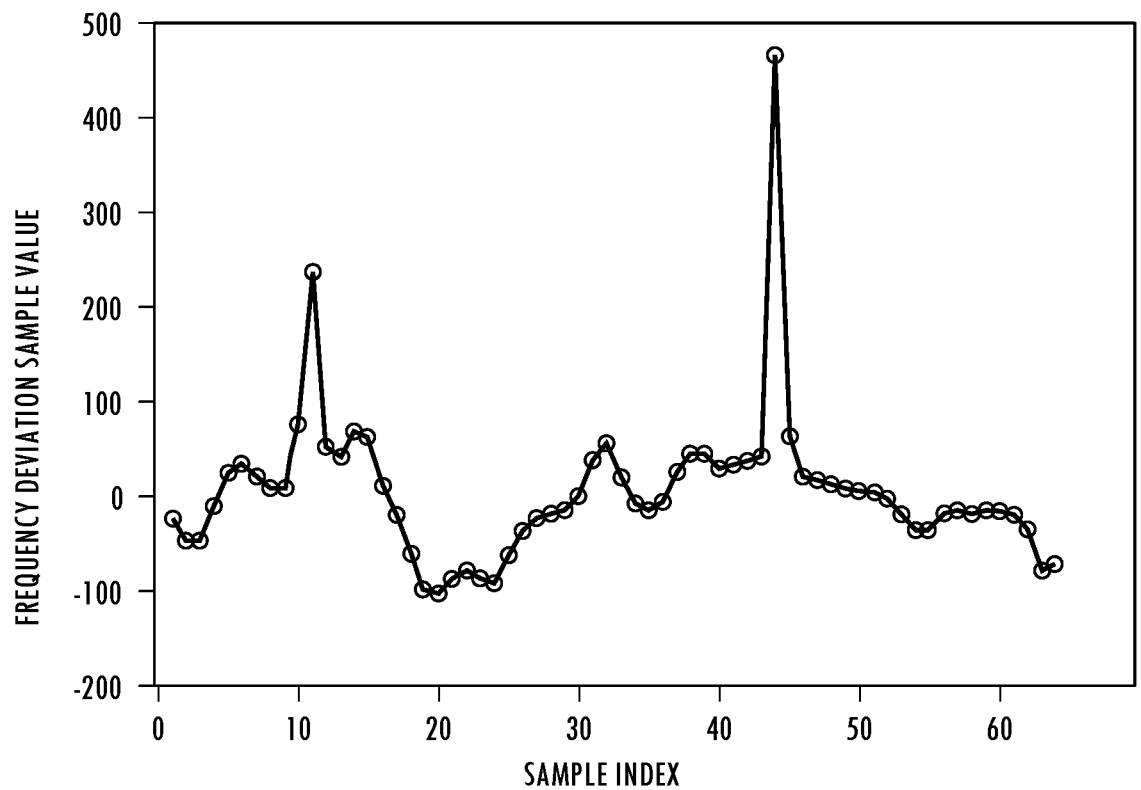
FIG. 13 illustrates frequency deviation samples as a function of time for a received signal including BLE2M data received by a signal detector configured in a BLE1M detection mode of operation.

Referring to FIGS. 12 and 13, in at least one embodiment, signal detector 166 is configured to detect BLE1M data. If after pre-processing a window of frequency deviation samples, the window includes a cluster of frequency deviation samples having zero or negligible frequency deviation, then signal detector 166 rejects the window of frequency deviation samples as not being BLE1M data. In at least one embodiment, signal detector 166 determines a cluster of frequency deviation samples having zero or negligible frequency deviation based on a count of the number of continuous frequency deviation samples in the window that have a frequency deviation below a predetermined frequency deviation threshold (e.g., a frequency deviation of 20, which corresponds to 250 kHz×20/64~78 kHz) using a comparison to a predetermined cluster count (e.g., eight frequency deviation samples for a 16 μs window). In at least one embodiment, this technique reduces or eliminates the false alarm rate of a signal detector configured to detect data transmitted compliant with BLE1M receiving data transmitted compliant with BLE2M at power levels as low as −100 dBm.

In an embodiment of signal detector 166 configured to detect BLE2M data or Zigbee data, a buffer includes windows of frequency deviation samples identified by noise detector 154 as including BLE1M, BLE2M, or Zigbee data transmitted using one of the predetermined communications protocols. As discussed above, transmission of Zigbee data uses a pseudorandom bit sequence known as a spreading sequence. Each bit of the spreading sequence is referred to as a chip. Each nibble of data (e.g., a value that would otherwise be represented by four bits of data) is represented by a 32-bit chip sequence. A receiver reconstructs a transmitted data symbol by correlating a received 32-bit sequence with each of the predetermined 32-bit chip sequences and determining which of the predetermined chip sequences has the maximum correlation to the received 32-bit sequence. In at least one embodiment, a first set of eight chip sequences corresponds to positive values and the next set of eight chip sequences are negatives of the first eight chip sequences.

The chip sequences are pseudorandom bit sequences i.e., spreading sequences, that cause the transmitted signal to have a wider bandwidth than the information bandwidth to reduce overall signal interference. An exemplary predetermined set of chip sequences used by Zigbee in a 2400 MHz frequency band and compliant with IEEE 802.15.4 uses sixteen distinct chip sequences:

TABLE 1

Zigbee Chip Sequences

| DATA SYMBOL | CHIP SEQUENCE ($c_0c_1c_2c_3 \ldots c_{29}c_{30}c_{31}$) |
|---|---|
| 0 | 11011001110000110101001000101110 |
| 1 | 11101101100111000011010100100010 |
| 2 | 00101110110110011100001101010010 |
| 3 | 00100010111011011001110000110101 |
| 4 | 01010010001011101101100111000011 |
| 5 | 00110101001000101110110110011100 |
| 6 | 11000011010100100010111011011001 |
| 7 | 10011100001101010010001011101101 |
| 8 | 10001100100101100000011101111011 |
| 9 | 10111000110010010110000001110111 |
| 10 | 01111011100011001001011000000111 |
| 11 | 01110111101110001100100101100000 |
| 12 | 00000111011110111000110010010110 |
| 13 | 01100000011101111011100011001001 |
| 14 | 10010110000001110111101110001100 |
| 15 | 11001001011000000111011110111000 |

These are the only allowable patterns of data that the Zigbee communications protocol supports. Thus, if the frequency deviation samples in the buffer correlate to any one of these chip sequences, the received signal likely includes Zigbee data. If the frequency deviation samples in the buffer do not correlate to one of these chip sequences, the received signal likely includes BLE2M data. Chip-based correlator 162 correlates the frequency deviation samples to each chip sequence of a predetermined set of chip sequences. In an embodiment, chip sequences above for Cartesian samples are transformed to minimum shift-keying (MSK) frequency spreading DSSS sequences s0-s15, where s8-s15 are negative values of s0-s7. Thus, only eight correlations are performed and the absolute value of a correlation of a chip sequence with frequency deviation samples is used to determine whether the frequency deviation samples correlate to a chip sequence.

In at least one embodiment, since the received signal is oversampled by the OSR, signal detector 166 expressly or inherently performs decimation 160 on the frequency deviation samples by the OSR, e.g., within chip-based correlator 162 or as part of the chip-based correlation technique. In at least one embodiment, each window includes 128 frequency deviation samples, i.e., the window includes four phases for each chip and decimation can be performed by selecting any one of four phases as the actual sample. In at least one embodiment, signal detector 166 determines the Zigbee symbol timing (i.e., which phase to be used for the recovery clock), as described above. To determine the Zigbee symbol boundary, chip-based correlator 162 sweeps a window of frequency deviation samples in OSR steps to determine a starting chip position of a complete Zigbee symbol (i.e., a starting chip position of a 32-chip DSSS symbol). However, chip-based correlator 162 does not have knowledge of the boundaries of the Zigbee symbols (i.e., the starting chip position of the 32 chips). If chip-based correlator 162 starts with the frequency deviation samples in the first 16 µs of the detection window, those frequency deviation samples may include a first portion of frequency deviation samples from a first Zigbee symbol and a second portion of frequency deviation samples from a second Zigbee symbol. If the samples of the first 16 µs of the detection window are correlated with the spreading code used to generate those samples, the correlation will not produce a peak. Only a complete Zigbee symbol that is aligned with the spreading code will produce a peak value. After detecting the symbol timing, since the incoming signal is oversampled (e.g., four samples per chip where the OSR is four), only one of the four frequency deviation samples is needed to represent the actual value of the chip. Therefore, to detect the boundary of the Zigbee symbol, chip-based correlator 162 slides a chip by a number of samples based on the OSR (e.g., slide by four samples where the OSR is four) for all 32 chip positions. Signal detector 166 detects a valid Zigbee symbol when chip-based correlator 162 performs a correlation that produces a peak. In an embodiment, a correlation is identified as producing a peak if the correlation exceeds a predetermined threshold correlation value.

As described above, signal detector 166 performs chip-based correlator 162 utilizing the predetermined chip sequences specified by the Zigbee communications protocol to determine whether the buffered frequency deviation samples correspond to Zigbee data. In at least one embodiment, if signal detector 166 determines that the buffered samples utilize the predetermined chip sequences, then signal detector 166 generates an indication that buffered frequency deviation samples correspond to Zigbee data. In an embodiment of signal detector 166 that is configured to detect only data communicated using the Zigbee protocol, if chip-based correlator 162 determines that the buffered frequency deviation samples do not use the predetermined chip sequences of the Zigbee communications protocol, then signal detector 166 generates an indication that the buffered frequency deviation samples include only noise. In an embodiment of signal detector 166 that is configured to detect only BLE2M data, if chip-based correlator 162 determines that the buffered frequency deviation samples do not use the predetermined chip sequences of the Zigbee communications protocol, then signal detector 166 generates an indication that buffered frequency deviation samples are associated with BLE2M data.

Since '0' and '8' are base sequences of the Zigbee chip sequences, i.e., the first set of eight chip sequences and the second set of eight chip sequences of Table 1 may be generated by cyclic rotation of the corresponding base sequence, in at least one embodiment, chip-based correlator 162 uses two chip sequences and repeats each correlation multiple times after rotating the chip sequence. In at least one embodiment, since the first set of eight chip sequences are negative values of a second set of eight chip sequences, as discussed above, rather than perform correlations for each of the sixteen chip sequences, the absolute value of the correlation of 32 frequency deviation samples of the window with the first set of eight chip sequences is used.

In at least one embodiment, chip-based correlator 162 uses at least one 32-bit inner product of the incoming frequency deviation samples to each of the 16 predetermined chip sequences. Each correlation or inner product has a value that indicates the number of bits that matched a particular chip sequence. If the output is greater than a predetermined threshold, then chip-based correlator 162 determines that the buffered frequency deviation samples match the chip sequence and the buffered frequency deviation samples correspond to Zigbee data. Then chip-based correlator 162 increments the number of correlations that succeeded. In certain embodiments, chip-based correlator 162 includes a programmable threshold to indicate how many of the 32 frequency deviation samples must match before a correlation is detected for a particular chip sequence.

In at least one embodiment, if a correlation value for a chip sequence of the predetermined set of chip sequences exceeds a predetermined threshold value, then signal detector 166 generates an indication of detection of a window of frequency deviation samples compliant with the Zigbee communications protocol, and otherwise generates an indication that the window of frequency deviation samples correspond to BLE2M data. In at least one embodiment, signal detector 166 uses chip-based correlator 162 only when the signal identification circuit 122 is configured in a Zigbee detection mode of operation or a BLE2M detection mode of operation.

Figure 14:
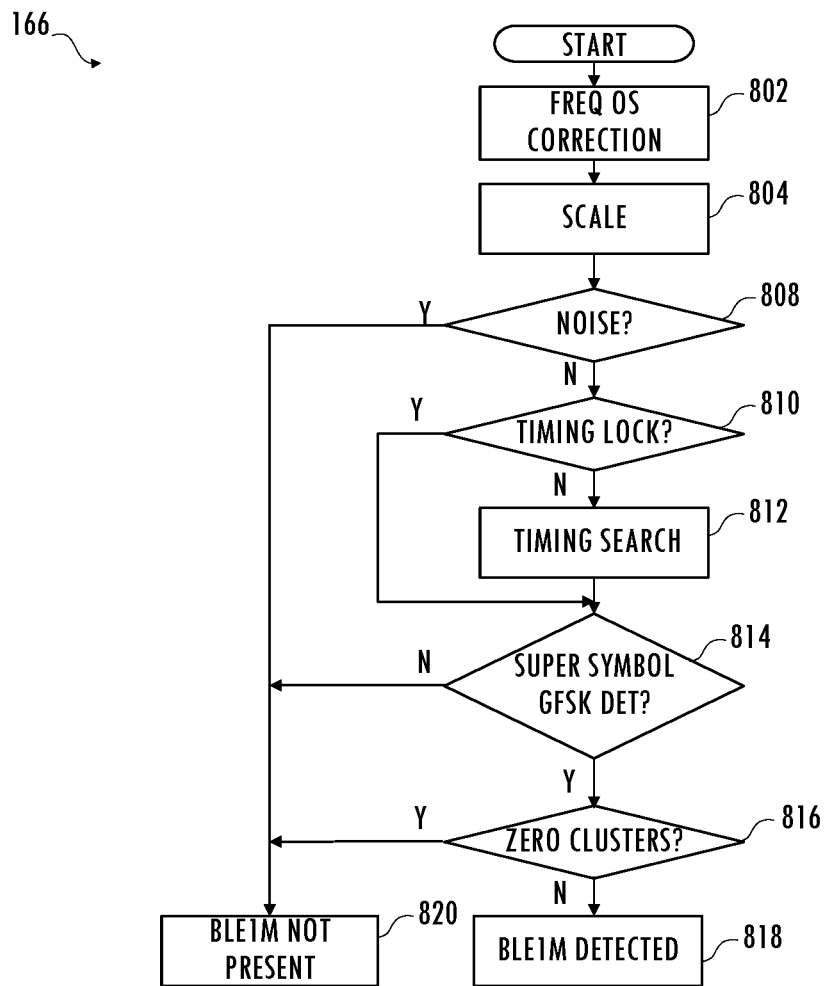
FIG. 14 illustrates information and control flows for detection of BLE1M data consistent with at least one embodiment of the invention.

Referring to FIGS. 5, 12, and 14, in at least one embodiment, signal detector 166 is configured in a BLE1M detection mode of operation. Windows of frequency deviation samples may be received from noise detector 154 or directly from differentiator 146. Signal detector 166 processes windows of frequency deviation samples by correcting frequency offset (802) and scaling the frequency deviation samples (804). Signal detector 166 then determines whether the window includes only noise or may include BLE1M data using a noise detection technique described above or another noise detection technique (808). If signal detector 166 detects only noise (808), then signal detector 166 indicates that BLE1M data is not present in the window. If the window does not comprise only noise (808), then signal detector 166 determines whether timing lock has been achieved (810). In at least one embodiment, signal detector 166 performs frequency offset correction after noise detection to speed up detection of BLE1M data at the expense of reduced noise detection sensitivity. The order of noise detection and frequency offset correction is programmable in some embodiments of signal detector 166.

Since the incoming signal is oversampled (e.g., four frequency deviation samples per bit), only one of the four frequency deviation samples represents the actual value of the bit. The first iteration of determining whether timing lock has been achieved will fail and signal detector 166 proceeds to perform a timing search (812). Timing search, described above, determines which of those four frequency deviation samples best represents the actual value of the bit. After achieving timing lock (810), signal detector 166 performs super symbol GFSK detection (814), as described above. If a BLE1M data is included in the window, then the frequency deviation will be within the expected frequency range (e.g., around 250 kHz) and the window of samples passes super symbol GFSK detection. BLE2M data or Zigbee data have a frequency deviation of 500 kHz and will appear to include frequency deviation outliers that fail super symbol GFSK detection in the BLE1M mode of detection. If a GFSK symbol is not detected (814), then signal detector 166 indicates that BLE1M data is not present in the window. If a GFSK symbol is detected (814), then signal detector 166 searches the window for clusters of zero or negligible frequency deviation (816), as described above. Since signal detector 166 is configured in a BLE1M detection mode of operation, a narrow bandwidth channel filter (e.g., a 1.1 MHz bandwidth channel filter) causes BLE2M data received by signal detector 166 to include continuous frequency deviation samples having zero or negligible frequency deviation due to the lower sample rate and narrow channel filter bandwidth in the BLE1M detection mode. If signal detector 166 detects clusters of zero or negligible frequency deviation samples (816), then signal detector 166 indicates that BLE1M data is not present in the window (820). If signal detector 166 does not detect clusters of zero frequency deviation samples (816), then signal detector 166 indicates detection of BLE1M data in the window (818).

Figure 15:
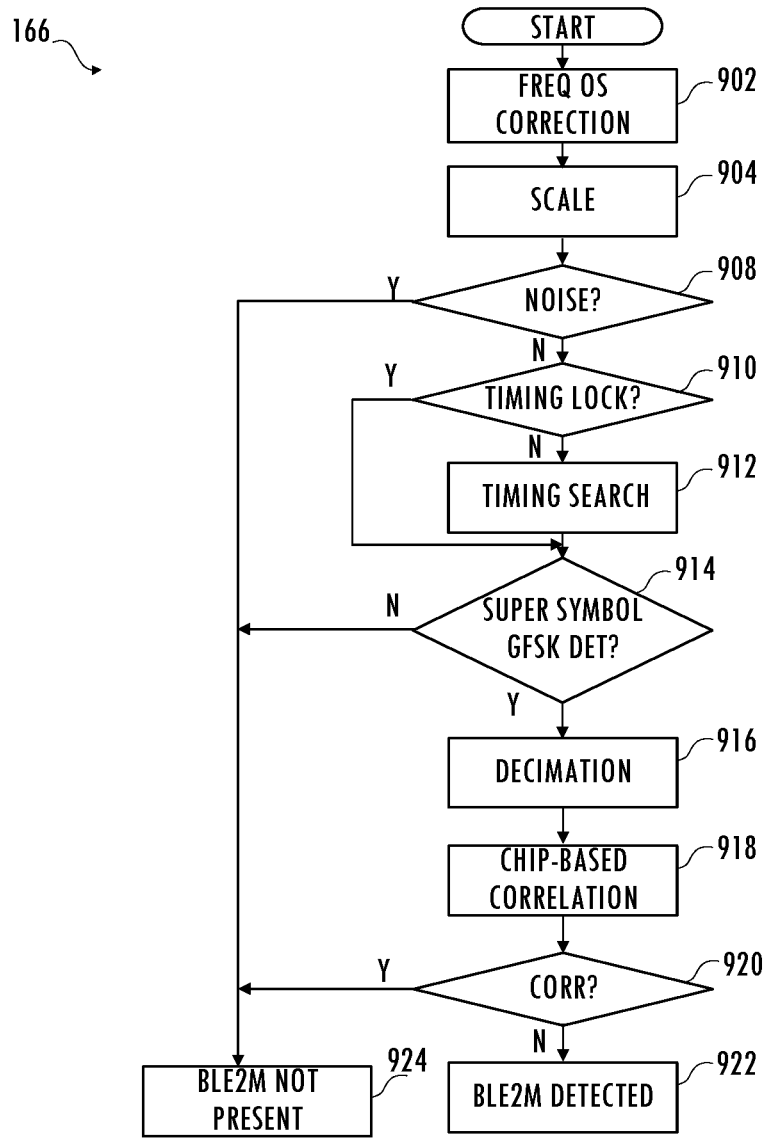
FIG. 15 illustrates information and control flows for detection of BLE2M consistent with at least one embodiment of the invention.

Referring to FIGS. 5, 12, and 15, in at least one embodiment, signal detector 166 is configured in the BLE2M detection mode of operation. Signal detector 166 processes windows of frequency deviation samples by correcting frequency offset (902) and scaling the frequency deviation samples (904). Signal detector 166 then determines whether the window includes only noise or may include BLE2M data using a noise detection technique described above or another noise detection technique (908). If signal detector 166 detects only noise (908), then signal detector 166 indicates that BLE2M data is not present in the window. If signal detector 166 does not detect only noise (908), then signal detector 166 determines whether timing lock has been achieved (910). Since the incoming signal is oversampled (e.g., four frequency deviation samples per bit), only one of the four frequency deviation samples represents the actual value of the bit. The first iteration of determining whether timing lock has been achieved will fail and signal detector 166 proceeds to perform a timing search (912). Timing search, described above, determines which of those four samples best represents the actual value of the bit. After achieving timing lock (910), signal detector 166 then performs super symbol GFSK detection (914), as described above.

If BLE1M data is included in the window, then the frequency deviation sample corresponds to 250 kHz, which is lower than the expected frequency deviation range for BLE2M data or Zigbee data, and will fail super symbol GFSK detection in the BLE2M detection mode of operation. If BLE2M data or Zigbee data is present in the window, then the frequency deviation sample will correspond to around 500 kHz and will pass super symbol GFSK detection in BLE2M mode. If super symbol GFSK detection fails (914), then signal detector 166 indicates that BLE2M data is not present in the window. If signal detector 166 detects a GFSK symbol (914), then in some embodiments, signal detector 166 decimates the window (916) and performs chip-based correlation consistent with techniques described above (918). If the window fails the chip-based correlation, then any data in the window is not Zigbee data and signal detector 166 indicates that BLE2M data is present in the window (922). If the window passes the chip-based correlation (920), then signal detector 166 indicates that BLE2M data is not present in the window (924).

Figure 16:
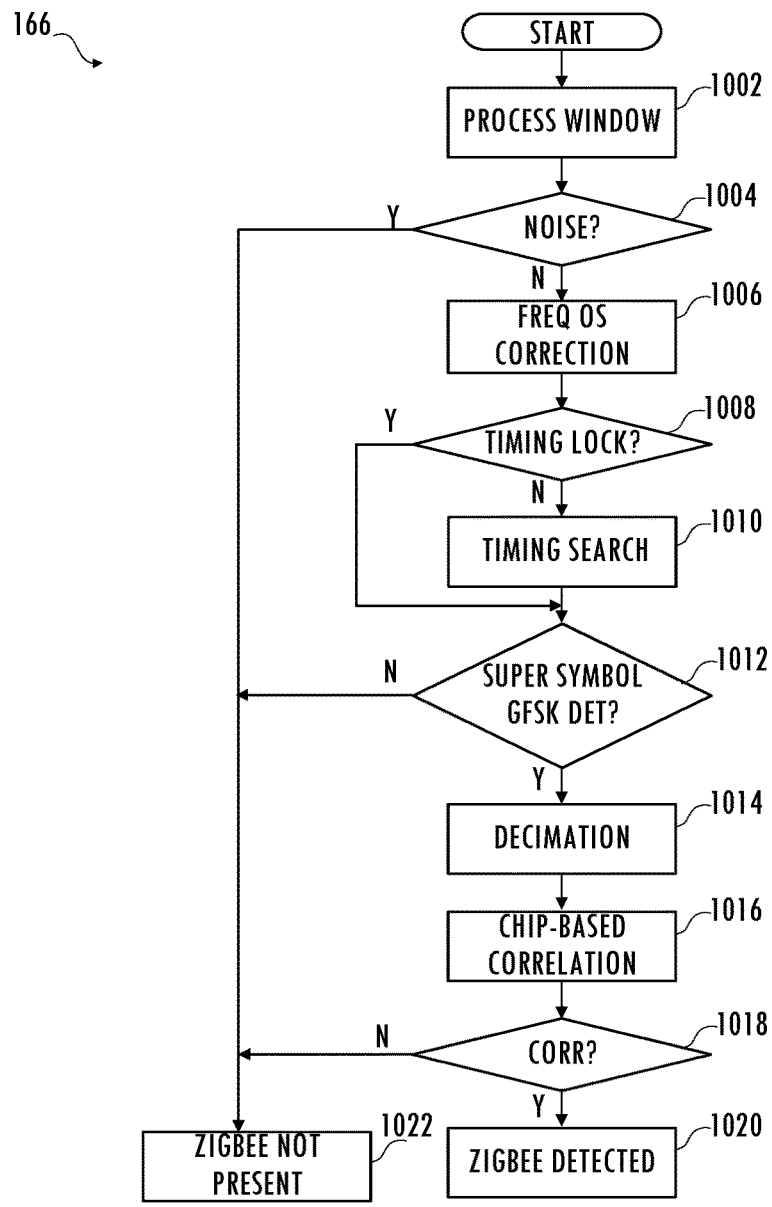
FIG. 16 illustrates information and control flows for detection of Zigbee consistent with at least one embodiment of the invention.

Referring to FIGS. 5, 12, and 16, in at least one embodiment, signal detector 166 is configured in the Zigbee detection mode of operation. Signal detector 166 processes windows of frequency deviation samples by scaling the frequency deviation samples (1002). Signal detector 166 then determines whether the window includes only noise or may include Zigbee data using a noise detection technique described above or another noise detection technique (1004). If signal detector 166 detects only noise (1004), then signal detector 166 indicates that Zigbee data is not present in the window. If the window does not comprise only noise (1004), then signal detector 166 corrects for frequency offset (1006). Next, signal detector 166 determines whether timing lock has been achieved (1008). Since the incoming signal is oversampled (e.g., four frequency deviation samples per bit), only one of the four frequency deviation samples represents the actual value of the bit. The first iteration of determining whether timing lock has been achieved will fail and signal detector 166 proceeds to perform a timing search (1010). Timing search, described above, determines which of those four samples best represents the actual value of the bit. After achieving timing lock (1008), signal detector 166 then performs super symbol GFSK detection (1012), as described above.

If BLE1M data is included in the window, then the frequency deviation sample corresponds to 250 kHz, which is lower than the expected frequency deviation range, and will fail super symbol GFSK detection in the BLE2M detection mode of operation. If BLE2M data or Zigbee data is present in the window, then the frequency deviation sample will correspond to around 500 kHz and will pass super symbol GFSK detection in BLE2M mode. If super symbol GFSK detection fails (1012), then signal detector 166 indicates that Zigbee data is not present in the window. If signal detector 166 detects a GFSK symbol (1012), then signal detector 166 may decimate the window (1014) and performs chip-based correlation consistent with techniques described above (1016). If the window fails the chip-based correlation (1018), then signal detector 166 indicates that Zigbee data is not present in the window (1022). If the window passes the chip-based correlation (1018), then signal detector 166 indicates that Zigbee data is detected in the window (1020).

In at least one embodiment, decimation may be inherently performed during the chip-based correlation. Although frequency values generated based on a sample-based phase differential computation (e.g., ($\phi$[n]-$\phi$[n-1])) provide higher resolution for noise detection, such frequency deviation computations can be too noisy for a correlation computation to detect data transmitted using low power signals (e.g., signals having power levels as low as -97 dBm). In at least one embodiment, signal detector 166 does not use all of the frequency deviation samples and thus does not use all of the phase information. Therefore, in at least one embodiment, signal identification circuit 122 performs a chip-based differential technique to generate the frequency deviation samples for Zigbee data detection. In other embodiments, signal identification circuit 122 applies a data filter to frequency deviation samples generated using a sample-based differential computation to improve the signal-to-noise ratio of the samples.

Figure 17:
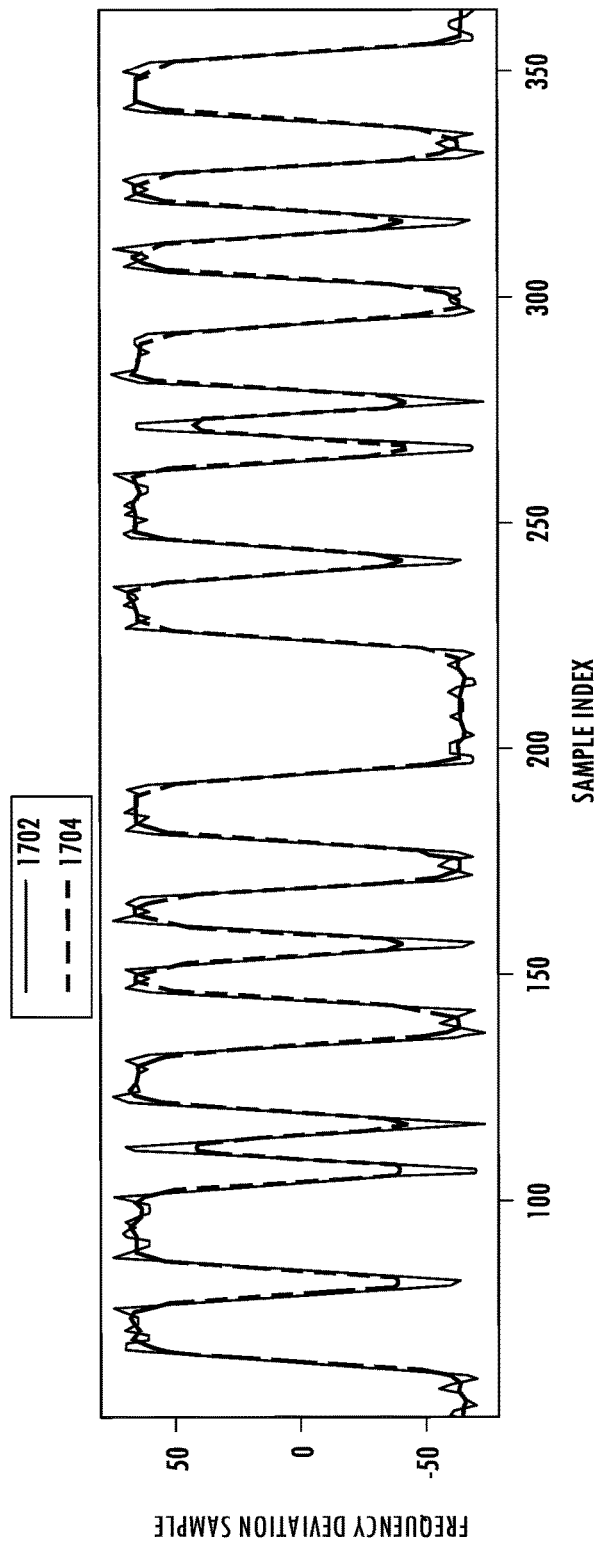
FIG. 17 illustrates waveforms of frequency deviation as a function of sample index for a sample-based frequency deviation of a received signal including data transmitted using one of a plurality of communications protocols and a chip-based frequency deviation of the received signal consistent with at least one embodiment of the invention.
Figure 18:
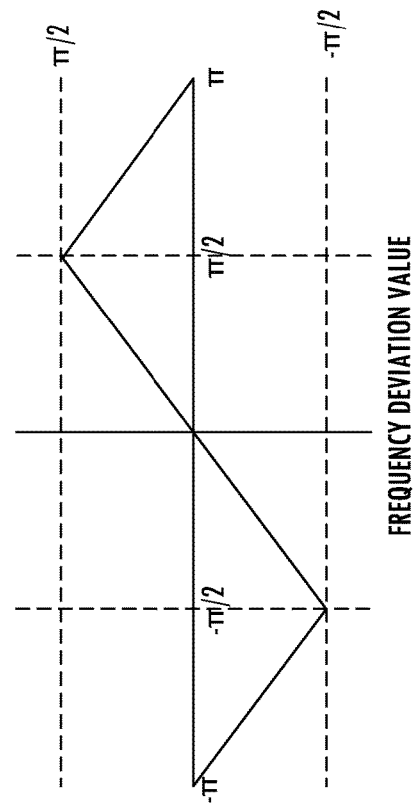
FIG. 18 illustrates a waveform of a weighting function used in soft clipping of frequency deviation samples of a received signal including data transmitted using one of a plurality of communications protocols consistent with at least one embodiment of the invention.

Referring to FIGS. 12, 17, and 18, in at least one embodiment, signal identification circuit 122 performs a chip-based differential to generate frequency deviation samples instead of sample-based differential to generate frequency deviation samples. For example, rather than using adjacent unwrapped phase values ($\phi$[n]-$\phi$[n-1]) to compute frequency deviation samples, differentiator 146 computes discrete time phase difference values using non-adjacent unwrapped phase values separated by a span value equal to the receiver OSR. For example, where the OSR equals four, the frequency deviation of sample n, f(n) is computed by $\phi$[n]-$\phi$[n-4], where $\phi$[n] is the phase output of a CORDIC configured to output amplitude and phase information.

In at least one embodiment, differentiator 146 provides data as: $\phi\_diff[m,n] = \phi[4 \times n+m] - \phi[4 \times n+m-4]$, where m varies inclusively between 0 and 3 cyclically and n is the chip number. For example, the table below illustrates calculating $\phi\_diff$ for three samples (n=0, 1, 2):

TABLE 2

Phase Difference Calculations with Span Equal to OSR of 4

| n | m | $\phi\_diff[m, n]$ |
|---|---|---|
| 0 | 0 | $\phi\_diff[0, 0] = \phi[0]-\phi[-4]$ |
| 0 | 1 | $\phi\_diff[1, 0] = \phi[1]-\phi[-3]$ |
| 0 | 2 | $\phi\_diff[2, 0] = \phi[2]-\phi[-2]$ |

TABLE 2-continued

Phase Difference Calculations with Span Equal to OSR of 4

| n | m | $\phi\_diff[m, n]$ |
|---|---|---|
| 0 | 3 | $\phi\_diff[3, 0] = \phi[3]-\phi[-1]$ |
| 1 | 0 | $\phi\_diff[0, 1] = \phi[4]-\phi[0]$ |
| 1 | 1 | $\phi\_diff[1, 1] = \phi[5]-\phi[1]$ |
| 1 | 2 | $\phi\_diff[2, 1] = \phi[6]-\phi[2]$ |
| 1 | 3 | $\phi\_diff[3, 1] = \phi[7]-\phi[3]$ |
| 2 | 0 | $\phi\_diff[0, 2] = \phi[8]-\phi[4]$ |
| 2 | 1 | $\phi\_diff[1, 2] = \phi[9]-\phi[5]$ |
| 2 | 2 | $\phi\_diff[2, 2] = \phi[10]-\phi[6]$ |
| 2 | 3 | $\phi\_diff[3, 2] = \phi[11]-\phi[7]$ |

The chip-based difference computation is equivalent to filtering the sample-based difference computation using an OSR data filter. Either technique improves the signal-to-noise ratio. For example, signal 1704, which is a chip-based frequency deviation signal, has an improvement in sensitivity of two dB as compared to signal 1702, which is a sample-based frequency signal. The chip-based difference computation introduces a fixed (e.g., (OSR-1)/2) sample delay.

In at least one embodiment, signal detector 166 relies solely on chip-based correlator 162 to distinguish between BLE2M data and Zigbee data. Signal noise that generates spikes in the frequency sample values can boost correlation values for lower signal levels and result in false detection of Zigbee data. An increase in the correlation threshold would reduce false detection but would also reduce sensitivity to low power signals. Rather than increasing the correlation threshold, in at least one embodiment, signal detector 166 implements a soft-clipping function to reduce false detection of Zigbee data. In at least one embodiment, the soft-clipping function is a SINE weighted function that clips frequency deviation samples that exceed a predetermined threshold frequency deviation.

In an exemplary embodiment. the frequency deviation samples are limited to a range between [-fmax, +fmax], e.g., fmax=128 (i.e., pi) and the soft-clip threshold value is set to 64 (i.e., $\pi/2$) although this threshold value is programmable to other values (e.g., 100). If the absolute value of the frequency deviation is less than the soft-clip threshold value (i.e., |freq|<$\pi/2$), then signal detector 166 passes the original frequency deviation sample to the chip-based correlator. If the absolute value of the frequency deviation is greater than the soft-clip threshold value and the frequency deviation is greater than zero (i.e., |freq|>$\pi/2$ and freq>0), then signal detector 166 passes an output frequency deviation sample having a value that is the difference between fmax and the frequency deviation sample (i.e., fout=fmax-freq) to the chip-based correlator 162. If the absolute value of the frequency deviation sample is greater than the soft-clip threshold value and the frequency deviation sample is less than zero (i.e., |freq|>$\pi/2$ and freq<0), then an output frequency deviation sample having a value that is the difference between-fmax and the frequency sample (i.e., fout=-fmax-freq) is passed to the chip-based correlator. The sine weighting function is exemplary only and in other embodiments, other soft-clipping functions are used (e.g., cubic nonlinearity function).

Figure 19:
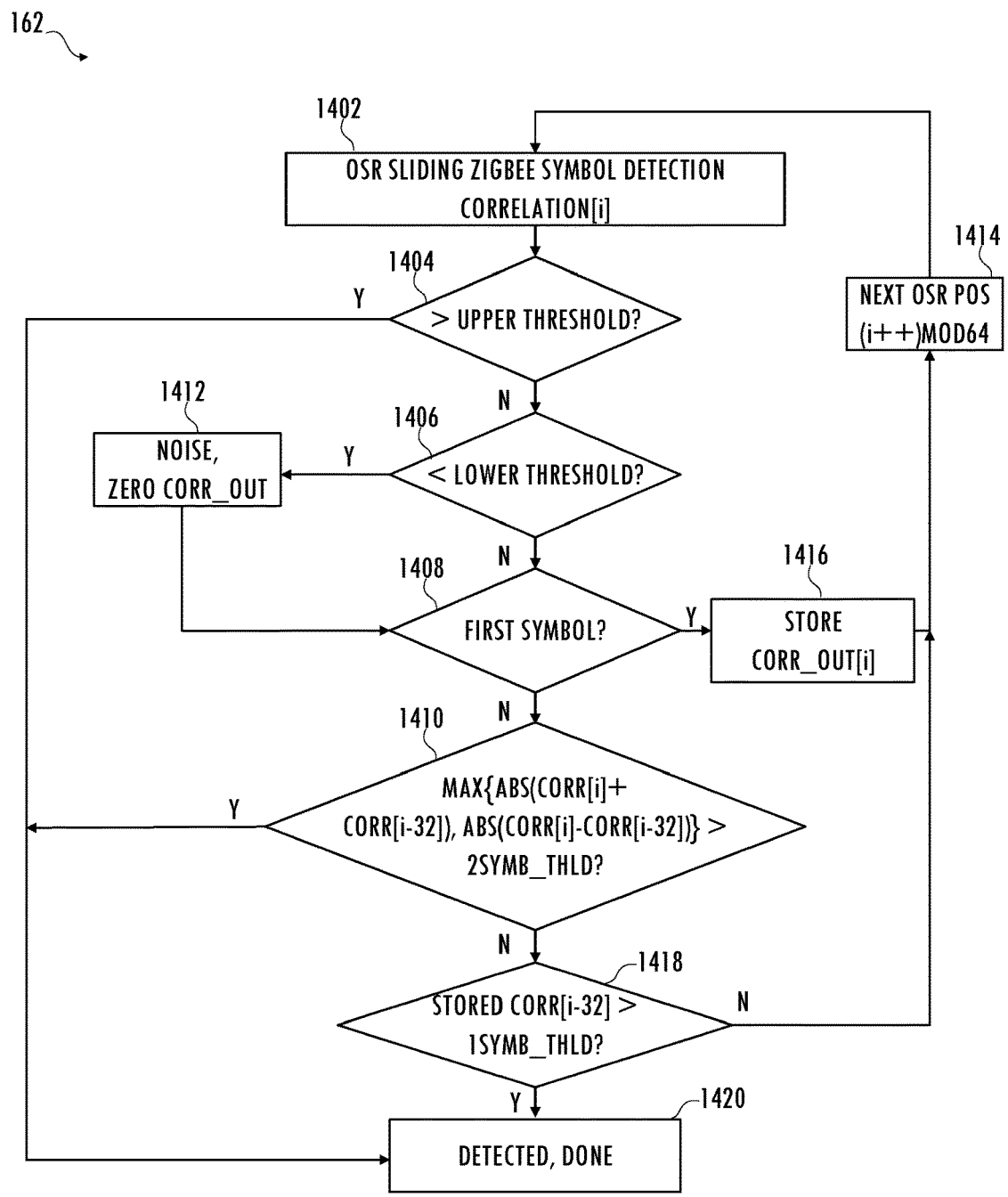
FIG. 19 illustrates information and control flows for chip correlation for detecting Zigbee data consistent with at least one embodiment of the invention.

Referring to FIGS. 12 and 19, in at least one embodiment, signal detector 166 implements an adaptive detection technique that selectively uses two windows of frequency deviation samples to improve Zigbee detection sensitivity beyond -97 dBm power levels. Signal detector 166 improves detection sensitivity of Zigbee data by 1.5-2 dB by adaptively using a second window of frequency deviation samples for chip-based correlation to detect Zigbee data based on two symbols. The adaptive technique identifies a symbol of Zigbee data using a first window of frequency deviation samples 85-90 percent of the time. If Zigbee data is not identified using the first window and a first set of threshold values, a second correlation of a second window is combined with a corresponding first correlation of the first window and compared to at least one additional threshold value to detect a symbol of Zigbee data with increased likelihood.

For example, chip-based correlator 162 performs sliding Zigbee symbol detection to detect a first complete Zigbee symbol by sliding by the OSR for a maximum of 32 chip positions for a first symbol until a peak is detected, as described above. If all 32 chip positions for a first symbol fail to detect a peak, then chip-based correlator 162 postpones the detection decision until after evaluating a second symbol. For example, chip-based correlator 162 initializes index i, corresponding to an $i^{th}$ chip position in a double window of samples. Chip-based correlator 162 outputs a maximum correlation value for the $i^{th}$ chip position of the double window (1402). Control logic 139 compares the $i^{th}$ correlation output to an upper threshold value (1404). If the $i^{th}$ correlation output is greater than the upper threshold value (1404), then chip-based correlator 162 detects a peak correlation value corresponding to a high likelihood of including Zigbee data and signal detector 166 detects Zigbee data (1420). If the $i^{th}$ correlation output is not greater than the upper threshold value (1404), then chip-based correlator 162 compares the $i^{th}$ correlation output to a lower threshold (1406). If the $i^{th}$ correlation output is less than the lower threshold value (1406), then the $i^{th}$ chip position of the symbol likely includes only noise (i.e., not likely to include a Zigbee signal) and chip-based correlator 162 clears the output of the correlation to reduce the likelihood of false detection based on computations using a correlation of an additional symbol (1412).

Next, signal detector 166 determines whether the correlation output is for a first symbol or a second symbol of the detection sequence (1408). For example, if i<32, then the correlation output corresponds to the first symbol and if i≥32 then the correlation output corresponds to the second symbol. If the $i^{th}$ correlation output corresponds to a first symbol of the detection sequence (e.g., i<32) (1408), then signal detector 166 stores the $i^{th}$ correlator output and chip-based correlator 162 selects next samples for detection, e.g., by incrementing index i to select a next OSR position in a window of samples (1414), and performs Zigbee symbol detection for the next OSR position of the window, as described above (1402).

If the $i^{th}$ correlation output corresponds to a second symbol of the detection sequence (e.g., i≥32) (1408), then signal detector 166 determines that the current correlation output is for a second symbol of frequency deviation samples in the window of samples (1408) and proceeds to evaluate a combination of the stored correlation value (e.g., the $(i-32)^{th}$ correlation value) for a first symbol and the corresponding correlation value (e.g., the $i^{th}$ correlation value) for the second symbol (e.g., MAX{ABS(CORR[i]+CORR[i-32]), ABS(CORR[i]−CORR[i-32])}) and compares that combination of correlation values to a two-symbol threshold value (e.g., 2SYMB_THLD) (1410). If the combined correlation value is greater than the two-symbol threshold value (e.g., MAX{ABS(CORR[i]+CORR[i-32]), ABS(CORR[i]−CORR[i-32])}>2SYMB_THLD), then Zigbee data is likely present in the window and chip-based correlator 162 detects Zigbee data (1420). If the combined correlation value is not greater than the two-symbol threshold value (e.g., MAX{ABS(CORR[i]+CORR[i-32]), ABS(CORR[i]−CORR[i-32])}≤2SYMB_THLD), then chip-based correlator 162 performs an additional comparison (1418) to a corresponding stored output correlation value (e.g., the $(i-32)^{th}$ correlation value) for the first symbol to detect Zigbee data in the event that the first symbol correlation is less than the upper threshold but still greater than another predetermined threshold for one symbol (e.g., 1SYMB_THLD). If the stored output correlation value for the first symbol (e.g., the $(i-32)^{th}$ correlation value) exceeds the additional predetermined threshold for one symbol (e.g., CORR[i-32]>1SYMB_THLD), then the first symbol likely includes Zigbee data and chip-based correlator 162 detects Zigbee data and, in some embodiments, resets index i for detection of a next symbol (1420). If the stored output correlation value for the first symbol (e.g., the $(i-32)^{th}$ correlation value) does not exceed the additional predetermined threshold for one symbol (e.g., CORR[i-32] ≤1SYMB_THLD), then the first symbol likely includes only noise and signal detector 166 repeats the process for a next OSR position of samples (1414).

The two-symbol adaptive Zigbee detection improves the detection sensitivity by approximately 1.5-2 dB. The upper threshold has a value that identifies 85%-90% of Zigbee symbols using a first symbol. Combination with a correlation for a second symbol, as described above, does not degrade the false alarm rate or degrade one-symbol detection performance for a partial packet. However, the two-symbol adaptive Zigbee detection does have a penalty of needing to store the 32 correlator values for the maximum chip correlation and introduces a detection latency for low power signals. In at least one embodiment, two-symbol adaptive Zigbee detection is selectable and is disabled if a target application only needs −95 dBm sensitivity. In an embodiment, each OSR position uses eight cycles to correlate eight possible Zigbee symbols. Note that the information and control flow of FIG. 20 is exemplary only and control logic implementing adaptive two symbol Zigbee detection consistent with techniques described herein may use other sequences of operations to improve the detection sensitivity using a second symbol.

Figure 20:
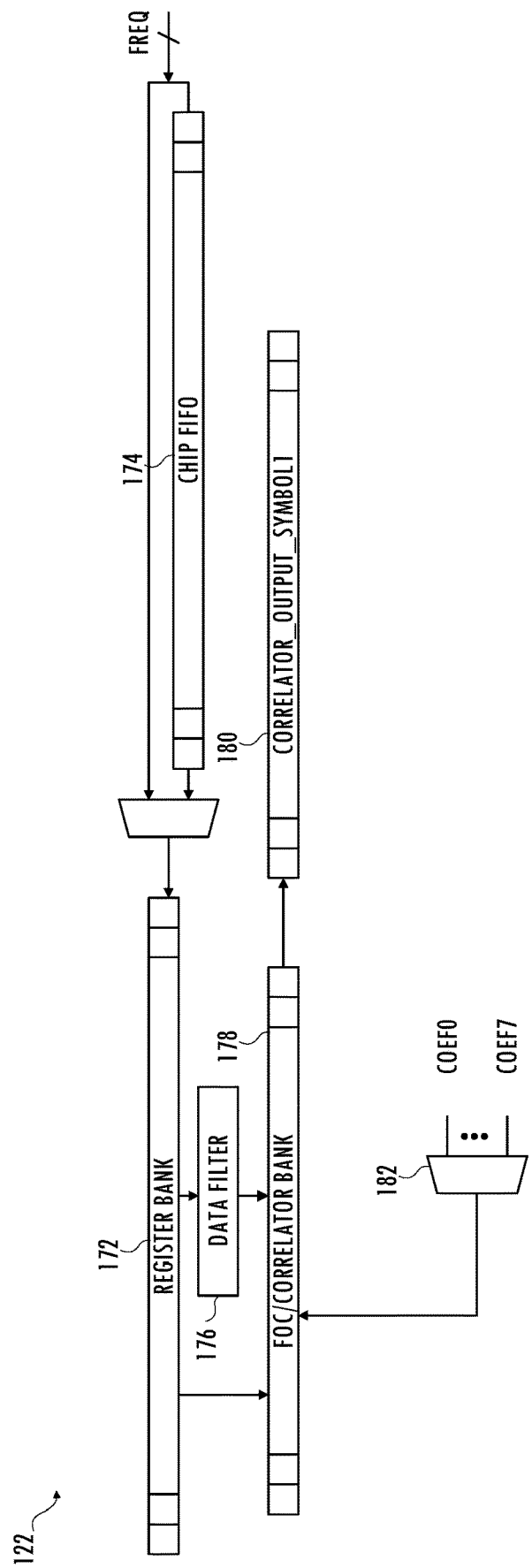
FIG. 20 illustrates a functional block diagram of exemplary hardware for implementing portions of the signal identification circuit of FIG. 12.

FIG. 20 illustrates exemplary hardware used to implement noise detector 154 and signal detector 166. Frequency deviation samples received from a phase-to frequency conversion are stored in register bank 172. Signal identifier 122 performs adaptive noise detection and signal detection using the contents of register bank 172. In addition, signal identifier 122 transfers frequency deviation samples from register bank 172 to FOC/correlator bank 178 for signal detection (e.g., frequency offset correction, noise detection, and correlation). In some embodiments, signal identifier 122 transfers frequency deviation samples from register bank 172 to data filter 176 prior to Zigbee or BLE2M detection. Meanwhile, chip FIFO 174 and register bank 172 continue to collect frequency deviation samples. Chip-based correlator 162 performs OSR sliding-based correlation, as described above, each time one chip is moved from chip FIFO 174 to chip-based correlator 162.

In at least one embodiment, register bank 172 and chip FIFO 174 continue to accumulate data while processing a first window of frequency samples. In some embodiments, register bank 172 collects two windows of frequency samples for adaptive noise detection. In some embodiments, register bank 172 collects a window of frequency samples (e.g., 16 μs or 32 chips) for signal detection. Chip FIFO 174 buffers incoming data after collecting the window of frequency samples (e.g., 32 chips) and chip FIFO 174 feeds one chip to register bank 172 for each oversample position for chip-based correlation described herein. FOC/correlator bank 178 is used for frequency offset calibration and noise detection for a single window of frequency samples for detection of BLE1M and is used for chip-based correlation for detection of BLE2M data and for detection of Zigbee data. Correlator output symbol 180 stores a maximum correlator output value for two-symbol detection described herein. In at least one embodiment, data filter 176 is a zero-order-hold filter (e.g., a four-tap finite impulse response filter) that is used to filter frequency deviation samples generated by a sample-based differentiation of phase values to provide samples equivalent to a chip-based differentiation. That is, in embodiments that use sample-based differentiation to generate frequency samples, data filter 176 provides chip-based frequency samples, which are lower noise than frequency samples generated by sample-based differentiation.

In an embodiment, the chip-based correlator 162 uses FOC/correlator bank 178 and correlation outputs for a first window stored in correlator_output_symbol1 180 for the adaptive two-symbol chip-based correlation described herein. In at least one embodiment, since eight of the spreading sequences correspond to negative values of the other eight spreading sequences and since correlations of data with codes that are negatives of each other generate correlation values having the same absolute value, only eight sequences are used to reduce hardware and detection time. Therefore, in an embodiment, select circuit 182 provides one of eight chip sequences (e.g., coef0, coef1, coef2, . . . , coef7) to FOC/correlator bank 178, which performs a correlation of the selected chip sequence and a 32-bit window of frequency deviation samples provided to the FOC/correlator bank 178 by data filter 176 or register bank 172. In at least one embodiment, select circuit 182 receives a control signal generated by a counter in chip-based correlator 162.

Thus, fast and accurate techniques for detecting noise and identifying which channels are used by which communications protocol have been disclosed. The description of the invention set forth herein is illustrative and is not intended to limit the scope of the invention as set forth in the following claims. For example, while the invention has been described in an embodiment of a receiver in which signals compliant with BLE1M, BLE2M and Zigbee communications protocols are identified, one of skill in the art will appreciate that teachings herein can be utilized to identify signals compliant with other FSK or DSSS communications protocols. The terms "first," "second," "third," and so forth, as used in the claims, unless otherwise clear by context, is to distinguish between different items in the claims and does not otherwise indicate or imply any order in time, location or quality. For example, "a first received signal," "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for detecting data transmitted using one of a plurality of communications protocols, the method comprising:

receiving a window of frequency deviation samples of an oversampled received signal;

correlating frequency deviation samples for a first chip position of a first symbol in the window with each of a set of predetermined chip sequences to generate correlation values and providing a maximum correlation value for the first chip position of the first symbol in the window; and determining whether to use one-symbol detection or two-symbol detection to detect data in the window based on an upper threshold value and at least the maximum correlation value.

2. The method as recited in claim 1 further comprising:
performing the two-symbol detection in response to each maximum correlation value for each chip position of the first symbol in the window being less than the upper threshold value.

3. The method as recited in claim 2 wherein the two-symbol detection comprises:
detecting whether the window includes data based on the maximum correlation value, a second maximum correlation value of a corresponding chip position of a second symbol in the window, and a second upper threshold value.

4. The method as recited in claim 3 wherein the two-symbol detection further comprises:
detecting whether the window includes data based on a stored correlation value for the first symbol and a third upper threshold value.

5. The method as recited in claim 2 wherein the two-symbol detection detects the data in response to the maximum correlation value for each chip position of the first symbol being less than the upper threshold value and a combination of at least one chip position of a second symbol having a corresponding maximum correlation value with a respective stored maximum correlation value of the first symbol being greater than a second upper threshold value.

6. The method as recited in claim 5 wherein the data is a Direct Sequence Spread Spectrum (DSSS) Offset-Quadrature Phase-Shift Keying (OQPSK) modulated data.

7. The method as recited in claim 1 further comprising:
converting phase samples to frequency deviation samples to generate the window by subtracting an $(i+M)^{th}$ phase sample from an $i^{th}$ phase sample to generate an $i^{th}$ frequency deviation sample, M being an oversample rate of the oversampled received signal.

8. The method as recited in claim 7 further comprising:
generating clipped frequency deviation samples of the window using a second comparison of a magnitude of each frequency deviation sample of the window to a predetermined threshold.

9. The method as recited in claim 8 wherein the clipped frequency deviation samples are generated using a weighting function.

10. The method as recited in claim 9 wherein the weighting function is a sine weighting function.

11. A receiver comprising:
a signal detection circuit configured to detect data transmitted using one of a plurality of communications protocols in a window of frequency deviation samples, wherein the signal detection circuit:
correlates frequency deviation samples for a first chip position of a first symbol in the window with each of a set of predetermined chip sequences to generate correlation values and provide a maximum correlation value for the first chip position of the first symbol in the window; and
determines whether to use one-symbol detection or two-symbol detection to detect data in the window based on an upper threshold value and at least the maximum correlation value.

12. The receiver as recited in claim 11 wherein the signal detection circuit is configured for two-symbol detection in response to each maximum correlation value for each chip position of the first symbol in the window being less than the upper threshold value.

13. The receiver as recited in claim 12 wherein the signal detection circuit is configured for two-symbol detection, the signal detection circuit being further configured to detect whether the window includes data based on the maximum correlation value, a second maximum correlation value of a corresponding chip position of a second symbol in the window, and a second upper threshold value.

14. The receiver as recited in claim 11 wherein the receiver comprises a phase-to-frequency conversion circuit configured to generate the window by subtracting an $(i+M)^{th}$ phase sample from an $i^{th}$ phase sample to generate an $i^{th}$ frequency sample, M being an over-sample rate of the receiver.

15. The receiver as recited in claim 14 further comprising:
a clipping circuit configured to clip frequency deviation samples of the window using a second comparison of a magnitude of each frequency deviation sample of the window to a predetermined threshold.

16. The receiver as recited in claim 15 wherein the clipping circuit applies a weighting function to generate a clipped frequency deviation sample.

17. The receiver as recited in claim 11 wherein the signal detection circuit detects a Direct Sequence Spread Spectrum (DSSS) Offset-Quadrature Phase-Shift Keying (OQPSK) modulated data.

18. The receiver as recited in claim 11 wherein the signal detection circuit comprises:
a storage element; and
a processor configured to execute instructions stored in the storage element, the instructions being executable by the processor to cause the processor to, for each oversample rate position of the window:
correlate frequency deviation samples for the first chip position of a first symbol in the window with each of the set of the predetermined chip sequences to generate correlation values and provide the maximum correlation value for the first chip position of the first symbol in the window;
determine whether to use the one-symbol detection or the two-symbol detection to detect data in the window based on the upper threshold value and at least the maximum correlation value.

19. A method for detecting data transmitted using one of a plurality of communications protocols in an oversampled received signal, the method comprising:
receiving a window of frequency deviation samples having an oversample rate of M;
converting phase samples to frequency samples to generate the window by subtracting an $(i+1)^{th}$ phase sample from an $i^{th}$ phase sample to generate an $i^{th}$ frequency deviation sample;
filtering the window to generate chip-based frequency deviation samples using a filter with a number of taps corresponding to the oversample rate; and
detecting data transmitted using one of the plurality of communications protocols in the oversampled received signal using a correlation based on the window and a predetermined set of Direct Sequence Spread Spectrum symbols.

20. The method as recited in claim 19 further comprising:
generating clipped frequency deviation samples of the window using a second comparison of a magnitude of each sample of the window of frequency deviation samples to a predetermined threshold,
wherein the clipped frequency deviation samples are generated using a weighting function.

* * * * *